US008576168B2

(12) United States Patent
Kabasawa et al.

(10) Patent No.: US 8,576,168 B2
(45) Date of Patent: Nov. 5, 2013

(54) INPUT APPARATUS, CONTROL APPARATUS, CONTROL SYSTEM, CONTROL METHOD, AND HANDHELD APPARATUS

(75) Inventors: Hidetoshi Kabasawa, Saitama (JP); Hisashi Kimura, Chiba (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 403 days.

(21) Appl. No.: 12/526,473

(22) PCT Filed: Dec. 4, 2008

(86) PCT No.: PCT/JP2008/072097
§ 371 (c)(1),
(2), (4) Date: Aug. 7, 2009

(87) PCT Pub. No.: WO2009/072583
PCT Pub. Date: Jun. 11, 2009

(65) Prior Publication Data
US 2010/0321291 A1    Dec. 23, 2010

(30) Foreign Application Priority Data

Dec. 7, 2007 (JP) ................................. 2007-317303

(51) Int. Cl.
*G06F 3/033* (2013.01)
*G01P 15/00* (2006.01)
(52) U.S. Cl.
USPC .......................... 345/157; 345/158; 73/514.01
(58) Field of Classification Search
USPC .................................................. 345/156–169
See application file for complete search history.

(56) References Cited

U.S. PATENT DOCUMENTS

| 5,554,980 | A | * | 9/1996 | Hashimoto et al. ........... 345/158 |
| 5,598,187 | A | | 1/1997 | Ide et al. |
| 6,164,808 | A | | 12/2000 | Shibata et al. |
| 6,466,831 | B1 | | 10/2002 | Shibata et al. |
| 7,180,500 | B2 | * | 2/2007 | Marvit et al. ................. 345/156 |

(Continued)

FOREIGN PATENT DOCUMENTS

| JP | 61-89940 | 6/1986 |
| JP | 8-278846 | 11/1996 |

(Continued)

OTHER PUBLICATIONS

International Search Report (PCT/JP2008-072097) dated Jan. 20, 2009.

(Continued)

*Primary Examiner* — Alexander Eisen
*Assistant Examiner* — Amit Chatly
(74) *Attorney, Agent, or Firm* — K&L Gates LLP

(57) ABSTRACT

A 3-dimensional operation input apparatus, a control apparatus, a control system, a control method, and a handheld apparatus are provided with which planar operations are possible without an increase in the number of components. An input apparatus includes an angular velocity sensor unit and an acceleration sensor. A threshold value is set to angular velocity values detected by the angular velocity sensor unit. Depending on whether the angular velocity values are smaller than the threshold value and whether at least one of acceleration values is larger than a threshold value, a switch can be made between a planar operation mode and a 3-dimensional operation mode. Therefore, a switch can be made between the planar operation mode and the 3-dimensional operation mode without having to use a sensor other than the acceleration sensor and the angular velocity sensor without increasing the number of components.

16 Claims, 26 Drawing Sheets

(56) References Cited

U.S. PATENT DOCUMENTS

2006/0256077 A1 11/2006 Tsai et al.
2008/0134784 A1* 6/2008 Jeng et al. .................. 73/514.01
2009/0009471 A1* 1/2009 Yamamoto et al. ........... 345/158

FOREIGN PATENT DOCUMENTS

| | | |
|---|---|---|
| JP | 11-95915 | 4/1999 |
| JP | 2002-7027 | 1/2001 |
| JP | 3748483 | 12/2005 |
| JP | 7-28591 | 1/2007 |
| JP | 2001-56743 | 2/2010 |

OTHER PUBLICATIONS

European Search Report issued Feb. 22, 2012, for corresponding European Appln. No. 0885800.6.

* cited by examiner (A)

(B)

INPUT APPARATUS, CONTROL APPARATUS, CONTROL SYSTEM, CONTROL METHOD, AND HANDHELD APPARATUS

CROSS REFERENCE TO RELATED APPLICATIONS

The present application is a National State of International Application No. PCT/JP2008/072097 filed on Dec. 4, 2008 and which claims priority to Japanese Patent Application No. 2007-317303 filed on Dec. 7, 2007, the entire contents of which are being incorporated herein by reference.

BACKGROUND

The present relates to an input apparatus for operating a GUI (Graphical User Interface), a control apparatus for controlling the GUI in accordance with operational information thereof, a control system including those apparatuses, a control method, and a handheld apparatus.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Patent Document 1).

Patent Document 1 discloses an input apparatus including angular velocity gyroscopes of two axes, that is, two angular velocity sensors. Each angular velocity sensor is a vibration-type angular velocity sensor. For example, upon application of an angular velocity with respect to a vibrating body piezo-electrically vibrating at a resonance frequency, Coriolis force is generated in a direction orthogonal to a vibration direction of the vibrating body. The Coriolis force is in proportion to the angular velocity, so detection of the Coriolis force leads to detection of the angular velocity. The input apparatus of Patent Document 1 detects angular velocities about two orthogonal axes by the angular velocity sensors, generates, in accordance with the angular velocities, a signal as positional information of a cursor or the like displayed by a display means, and transmits it to a control apparatus.

Patent Document 2 discloses a pen-type input apparatus including three (triaxial) acceleration sensors and three (triaxial) angular velocity sensors (gyro). The pen-type input apparatus executes various operations based on signals obtained by the three acceleration sensors and the three angular velocity sensors, to thus calculate a positional angle of the pen-type input apparatus.

The acceleration sensors detect not only accelerations at a time a user operates the input apparatus, but also gravity accelerations. Because gravity that acts on the input apparatus and an inertial force of the input apparatus generated when the input apparatus is moved are of the same physical amount, it is impossible for the input apparatus to make a distinction therebetween. For example, when the user swiftly moves the input apparatus in a horizontal direction, a combined force of the inertial force and the gravity is misrecognized as being in a gravity direction (downward direction). The pen-type input apparatus of Patent Document 2 above detects triaxial angular velocities and accelerations in triaxial directions, that is, detects amounts in all 6 degrees of freedom, thus solving the problem on the inertial force and gravity as described above.

It should be noted that there are cases where a planar-operation-type mouse generally used nowadays includes an acceleration sensor (see, for example, Patent Document 3). An apparatus that uses this mouse outputs display data to a display section based on an acceleration of the mouse detected by the acceleration sensor.

Patent Document 1: Japanese Patent Application Laid-open No. 2001-56743 (paragraphs [0030] and [0031], FIG. 3)
Patent Document 2: Japanese Patent No. 3,748,483 (paragraphs [0033] and [0041], FIG. 1)
Patent Document 3: Japanese Utility Model Application Laid-open No. Sho 61-89940 (FIG. 1)

For using the 3-dimensional operation input apparatus described above as a planar-operation type like a generally-used mouse, the input apparatus needs to be provided with an optical sensor or the like for detecting that the input apparatus has been placed on a plane.

However, in a case where the optical sensor is provided, the number of components increases, thus requiring additional cost. Moreover, in a case where an optical sensor is provided in addition to an angular velocity sensor and the like for detecting a 3-dimensional movement of the input apparatus, a space for arranging the optical sensor becomes a problem, with the result that design of the input apparatus is restricted.

It is therefore desired to provide a 3-dimensional operation input apparatus, a control apparatus, a control system, a control method, and a handheld apparatus with which planar operations are possible without an increase in the number of components.

SUMMARY

According to an embodiment, there is provided an input apparatus controlling a movement of a pointer on a screen, including a casing, an inertia sensor, a plane-corresponding value calculation means, and a space-corresponding value calculation means.

The inertia sensor detects a movement of the casing. The plane-corresponding value calculation means calculates, based on a detection value of the inertia sensor, a plane-corresponding value that corresponds to the movement of the casing on a plane, the plane-corresponding value corresponding to a displacement amount of the pointer on the screen. The space-corresponding value calculation means calculates, based on the detection value of the inertia sensor, a space-corresponding value that corresponds to the movement of the casing in space, the space-corresponding value corresponding to the displacement amount of the pointer on the screen.

The input apparatus controls the movement of the pointer on the screen using the detection value of the inertia sensor in both cases where the input apparatus is operated on the plane and in space. Accordingly, a 3-dimensional operation input apparatus with which planar operations are possible can be provided without an increase in the number of components as compared to a structure in which a sensor is selectively used in accordance with a planar operation mode or a 3-dimensional operation mode.

The plane-corresponding value and the space-corresponding value include a plane velocity, a spatial velocity, a plane acceleration, a spatial acceleration, and the like, and any of the corresponding values can be obtained directly from the detection value of the inertia sensor or by an operation thereof.

The input apparatus further includes a judgment means and a switch means.

The judgment means judges whether the movement of the casing is on the plane or in space based on the detection value of the inertia sensor. The switch means makes a switch between, based on the judgment by the judgment means, the calculation of the plane-corresponding value by the plane-corresponding value calculation means and the calculation of the space-corresponding value by the space-corresponding value calculation means.

The judgment means may judge whether the movement of the casing is on the plane or in space based on a hand movement detection value of the inertia sensor. Because a detection value corresponding to a hand movement is not output when the casing is operated on the plane, it is possible to simply judge whether the movement of the casing is on the plane or in space based on presence/absence of the hand movement detection value.

The judgment means may judge whether the movement of the casing is on the plane or in space based on whether a movement detection value of the casing detected by the inertia sensor in a direction orthogonal to the plane is equal to or smaller than a predetermined value. When the casing is operated on the plane, the casing is rarely largely moved in the direction orthogonal to the plane. In this regard, it is possible to judge that the casing is operated in space when the movement of the casing in the direction orthogonal to the plane is detected.

The switch means may make the switch between the calculation of the plane-corresponding value by the plane-corresponding value calculation means and the calculation of the space-corresponding value by the space-corresponding value calculation means, when the judgment means consecutively makes the same judgment for over a predetermined time period. Accordingly, it becomes possible to enhance reliability of a result of the judgment by the judgment means.

The input apparatus may further include a first inertia sensor, a second inertia sensor, and a third inertia sensor. The first inertia sensor detects the movement of the casing in a direction along a first axis. The second inertia sensor detects the movement of the casing in a direction along a second axis orthogonal to the first axis. The third inertia sensor detects the movement of the casing in a direction along a third axis orthogonal to the first axis and the second axis. In this case, the space-corresponding value calculation means calculates a corresponding value that corresponds to the displacement amount of the pointer in a first direction on the screen based on a detection value of the first inertia sensor, and calculates a corresponding value that corresponds to the displacement amount of the pointer in a second direction on the screen based on a detection value of the second inertia sensor. On the other hand, the plane-corresponding value calculation means calculates a corresponding value that corresponds to the displacement amount of the pointer in the first direction on the screen based on the detection value of the first inertia sensor, and calculates a corresponding value that corresponds to the displacement amount of the pointer in the second direction on the screen based on a detection value of the third inertia sensor.

The input apparatus may further include a filter to remove from the detection value of the inertia sensor a vibration frequency component generated by the movement of the casing on the plane. Accordingly, when the input apparatus is moved on the plane, it is possible to remove frequency components of noises that are incorporated into the detection value of the inertia sensor when the input apparatus passes through an irregularity or a step on the plane, for example.

The inertia sensor may include an acceleration sensor to detect an acceleration of the casing and an angular velocity sensor to detect an angular velocity of the casing. The judgment means can judge whether the angular velocity value detected by the angular velocity sensor is smaller than a first threshold value, and the switch means can make the switch between the calculation of the plane-corresponding value by the plane-corresponding value calculation means and the calculation of the space-corresponding value by the space-corresponding value calculation means based on whether the angular velocity value is smaller than the first threshold value.

The angular velocity obtained when the user moves the input apparatus 3-dimensionally is sufficiently larger than the angular velocity obtained when the input apparatus is moved on the plane. This is because, when a human being moves the input apparatus naturally, the input apparatus is moved rotationally using at least one of a wrist, an elbow, and a shoulder as a rotational axis. The present invention uses this fact and sets the first threshold value for the angular velocity value so that the switch is made between the calculation of the plane-corresponding value and the calculation of the space-corresponding value in accordance with the judgment using the first threshold value. Accordingly, it is possible to switch calculation modes of corresponding values in the planar operation and the 3-dimensional operation of the input apparatus without using a sensor other than the acceleration sensor and the angular velocity sensor, for example.

The judgment means may additionally judge whether the acceleration value detected by the acceleration sensor is larger than a second threshold value. The switch means makes the switch between the calculation of the plane-corresponding value by the plane-corresponding value calculation means and the calculation of the space-corresponding value by the space-corresponding value calculation means based on whether the acceleration value is larger than the second threshold value when the angular velocity value is smaller than the first threshold value. Accordingly, it is possible to positively judge that the input apparatus is operated on the plane when the angular velocity value of the input apparatus is smaller than the first threshold value and the acceleration value is larger than the second threshold value.

According to an embodiment of the present invention, there is provided a control apparatus controlling display of a pointer displayed on a screen based on a detection value of an inertia sensor output from an input apparatus including a casing and the inertia sensor to detect a movement of the casing. The control apparatus includes:

a reception means for receiving the detection value of the inertia sensor output from the input apparatus;

a plane-corresponding value calculation means for calculating, based on the detection value of the inertia sensor received by the reception means, a plane-corresponding value that corresponds to the movement of the casing on a plane, the plane-corresponding value corresponding to a displacement amount of the pointer on the screen;

a space-corresponding value calculation means for calculating, based on the detection value of the inertia sensor received by the reception means, a space-corresponding value that corresponds to the movement of the casing in space, the space-corresponding value corresponding to the displacement amount of the pointer on the screen; and a coordinate information generation means for generating coordinate information of the pointer on the screen that corresponds to information on the plane-corresponding value or the space-corresponding value.

In the present embodiment, since the operations including the calculation of the plane-corresponding value, the calculation of the space-corresponding value, and the like are carried out on the control apparatus side, a load on the input apparatus side can be reduced.

According to an embodiment, there is provided a control system including an input apparatus to output information on a detection value and a control apparatus to control a movement of a pointer displayed on a screen based on the information on the detection value output from the input apparatus.

The input apparatus includes a casing, an inertia sensor, a plane-corresponding value calculation means, and a space-corresponding value calculation means. The inertia sensor detects a movement of the casing. The plane-corresponding value calculation means calculates, based on a detection value of the inertia sensor, a plane-corresponding value that corresponds to the movement of the casing on a plane, the plane-corresponding value corresponding to a displacement amount of the pointer on the screen. The space-corresponding value calculation means calculates, based on the detection value of the inertia sensor, a space-corresponding value that corresponds to the movement of the casing in space, the space-corresponding value corresponding to the displacement amount of the pointer on the screen.

The control apparatus includes a reception means and a coordinate information generation means. The reception means receives information on the plane-corresponding value or the space-corresponding value. The coordinate information generation means generates coordinate information of the pointer on the screen that corresponds to the information on the plane-corresponding value or the space-corresponding value.

According to another embodiment, there is provided a control system including an input apparatus to output information on a detection value and a control apparatus to control a movement of a pointer displayed on a screen based on the information on the detection value output from the input apparatus.

The input apparatus includes a casing, an inertia sensor, and an output means. The inertia sensor detects a movement of the casing. The output means outputs a detection value of the inertia sensor.

The control apparatus includes a reception means, a plane-corresponding value calculation means, a space-corresponding value calculation means, and a coordinate information generation means. The reception means receives information on the detection value of the inertia sensor output by the output means. The plane-corresponding value calculation means calculates, based on the detection value of the inertia sensor received by the reception means, a plane-corresponding value that corresponds to the movement of the casing on a plane, the plane-corresponding value corresponding to a displacement amount of the pointer on the screen. The space-corresponding value calculation means calculates, based on the detection value of the inertia sensor received by the reception means, a space-corresponding value that corresponds to the movement of the casing in space, the space-corresponding value corresponding to the displacement amount of the pointer on the screen. The coordinate information generation means generates coordinate information of the pointer on the screen that corresponds to information on the plane-corresponding value or the space-corresponding value.

According to an embodiment, there is provided a control method controlling a movement of a pointer displayed on a screen based on a movement of an input apparatus including a casing, the control method including detecting, by an inertia sensor, a movement of the casing. Whether the movement of the casing is on a plane or in space is judged based on a detection value of the inertia sensor. Based on the detection value of the inertia sensor, a switch is made between a calculation of a plane-corresponding value that corresponds to the movement of the casing on the plane, the plane-corresponding value corresponding to a displacement amount of the pointer on the screen, and a calculation of a space-corresponding value that corresponds to the movement of the casing in space, the space-corresponding value corresponding to the displacement amount of the pointer on the screen.

According to an embodiment of the present invention, there is provided a handheld apparatus controlling a movement of a pointer on a screen, including a casing, a display section, an inertia sensor, a plane-corresponding value calculation means, and a space-corresponding value calculation means.

The display section displays the screen. The inertia sensor detects a movement of the casing. The plane-corresponding value calculation means calculates, based on a detection value of the inertia sensor, a plane-corresponding value that corresponds to the movement of the casing on a plane, the plane-corresponding value corresponding to a displacement amount of the pointer on the screen. The space-corresponding value calculation means calculates, based on the detection value of the inertia sensor, a space-corresponding value that corresponds to the movement of the casing in space, the space-corresponding value corresponding to the displacement amount of the pointer on the screen.

As described above, according to the embodiments, it is possible to provide a 3-dimensional operation input apparatus, a control apparatus, a control system, a control method, and a handheld apparatus with which planar operations are possible without an increase in the number of components.

Additional features and advantages are described herein, and will be apparent from, the following Detailed Description and the figures.

DETAILED DESCRIPTION

Hereinafter, embodiments will be described with reference to the drawings.

Figure 1:
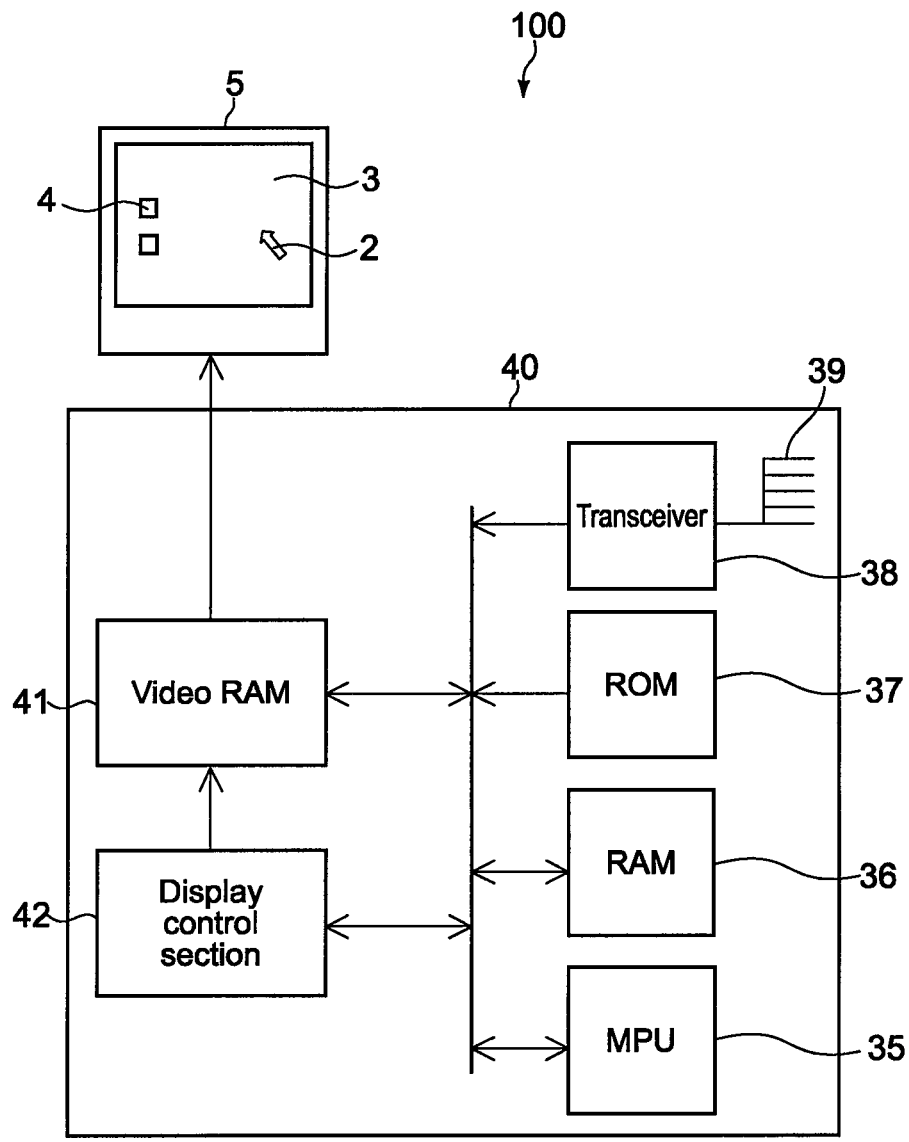
FIG. 1 A diagram showing a control system according to an embodiment.
Figure 1:

FIG. 1 is a diagram showing a control system according to an embodiment. A control system 100 includes a display apparatus 5, a control apparatus 40, and an input apparatus 1.

As shown in FIG. 1, the control apparatus 40 includes an MPU 35 (or CPU), a RAM 36, a ROM 37, a transceiver 38, an antenna 39, a video RAM 41, and a display control section 42.

The transceiver 38 receives a control signal transmitted from the input apparatus 1 via the antenna 39. The transceiver 38 is also capable of transmitting various predetermined signals to the input apparatus 1.

Based on the control signal, the MPU 35 carries out an operation for controlling a movement of a pointer (cursor) 2 displayed on a screen 3 of the display apparatus 5 or an operation for controlling execution of an icon 4. Accordingly, a display control signal for controlling a UI displayed on the screen 3 of the display apparatus 5 is generated.

The display control section 42 mainly generates screen data to be displayed on the screen 3 of the display apparatus 5 under control of the MPU 35. The video RAM 41 as a working area of the display control section 42 temporarily stores the generated screen data.

The control apparatus 40 may be an apparatus dedicated to the input apparatus 1, or may be a PC or the like. The control apparatus 40 is not limited to the apparatus dedicated to the input apparatus 1, and may be a computer integrally formed with the display apparatus 5, audiovisual equipment, a projector, a game device, a television, a car navigation system, or the like.

Figure 2:
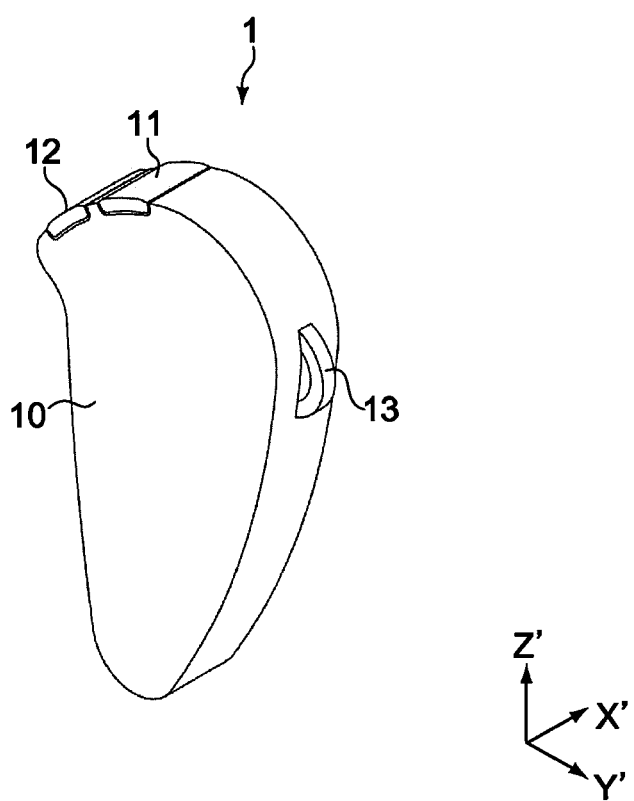
FIG. 2 A perspective diagram showing an input apparatus.

FIG. 2 is a perspective diagram showing the input apparatus 1.

The input apparatus 1 is a 3-dimensional pointing device used for inputting information to the display apparatus 5. The input apparatus 1 is of a size that a user is capable of holding. As shown in FIG. 2, the input apparatus 1 includes a casing 10 and operation sections including three buttons 11, 12, and 13 provided at an upper portion of the casing 10, for example.

The button 11 disposed closer to the center of the upper portion of the casing 10 functions as a left button of a mouse as an input device for a PC, for example. A file is executed when the button 11 is double-clicked. Moreover, a "drag and drop" operation may be executed by moving the input apparatus while pressing the button 11.

The button 12 adjacent to the button 11 functions as a right button of a mouse. For example, various option operations can be carried out.

The button 13 is a button used for switching effectiveness/ineffectiveness of a function for recognizing a tilt of the input apparatus 1. Further, the button 13 is a rotatable button, and the screen can be scrolled with a rotation thereof. Locations of the buttons 11, 12, and 13, a content of a command issued, and the like can arbitrarily be changed.

Figure 3:
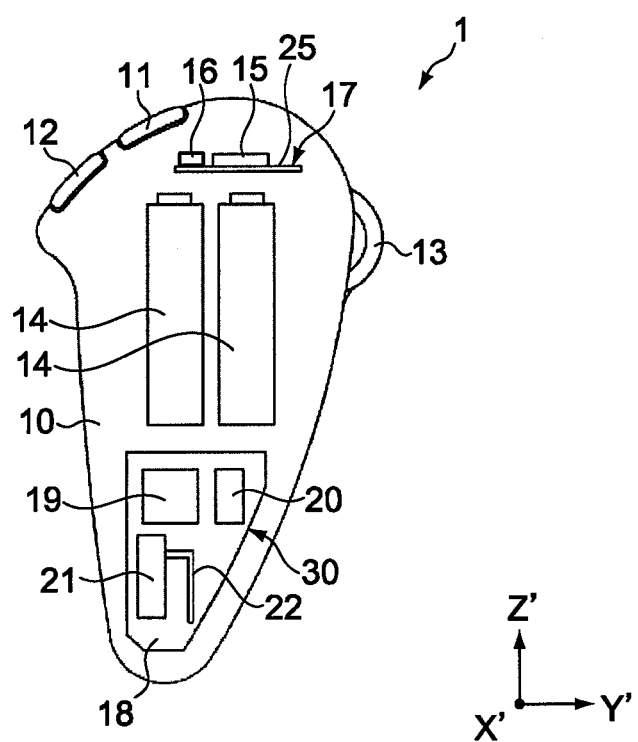
FIG. 3 A diagram schematically showing an internal structure of the input apparatus.

FIG. 3 is a diagram schematically showing an internal structure of the input apparatus 1. In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience.

As shown in FIG. 3, the input apparatus 1 includes a control unit 30, a sensor unit 17, and batteries 14.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

Figure 4:
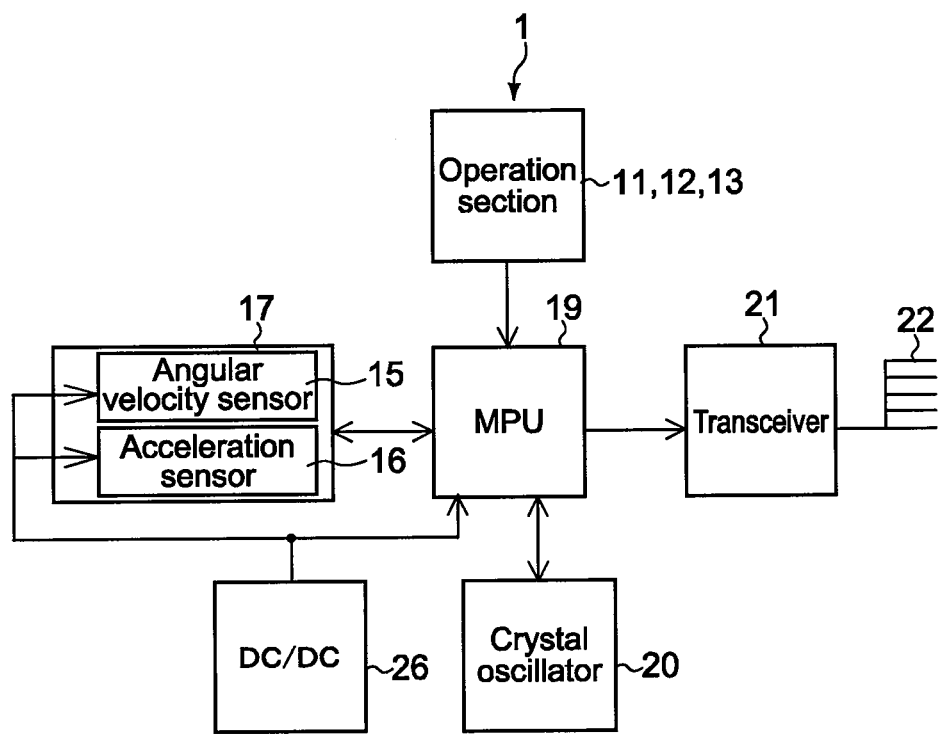
FIG. 4 A block diagram showing an electrical structure of the input apparatus.

FIG. 4 is a block diagram showing an electrical structure of the input apparatus 1.

The sensor unit 17 (inertia sensor) includes an angular velocity sensor unit (gyro sensor unit) 15 for detecting angular velocities about two orthogonal axes. The sensor unit 17 also includes an acceleration sensor unit 16 for detecting accelerations in different angles such as along three orthogonal axes (X' axis, Y' axis, and Z' axis).

As shown in FIG. 4, the MPU 19 includes a built-in volatile or nonvolatile memory requisite therefor. The MPU 19 is input with a detection signal from the sensor unit 17, an operation signal from the operation section, and the like, and executes various kinds of operational processing in order to generate control signals in response to those input signals. Specifically, as will be described later, the MPU 19 includes a function of calculating a plane velocity value (plane-corresponding value) that corresponds to the movement of the casing 10 on the plane (plane-corresponding value calculation means) and a function of calculating a spatial velocity value (space-corresponding value) that corresponds to a 3-dimensional movement of the casing 10 (space-corresponding value calculation means), the plane velocity value and the spatial velocity value corresponding to a displacement amount of the pointer 2 on the screen 3.

The crystal oscillator 20 generates clocks and supplies them to the MPU 19. As the batteries 14, dry cell batteries, rechargeable batteries, and the like are used.

The transceiver 21 transmits, as RF radio signals, the control signals (input information) generated in the MPU 19 to the control apparatus 40 via the antenna 22.

Power is passed through a DC/DC converter 26 so that a power supply voltage is stabilized, and is thereafter supplied to the sensor unit 17 and the MPU 19.

Figure 5:
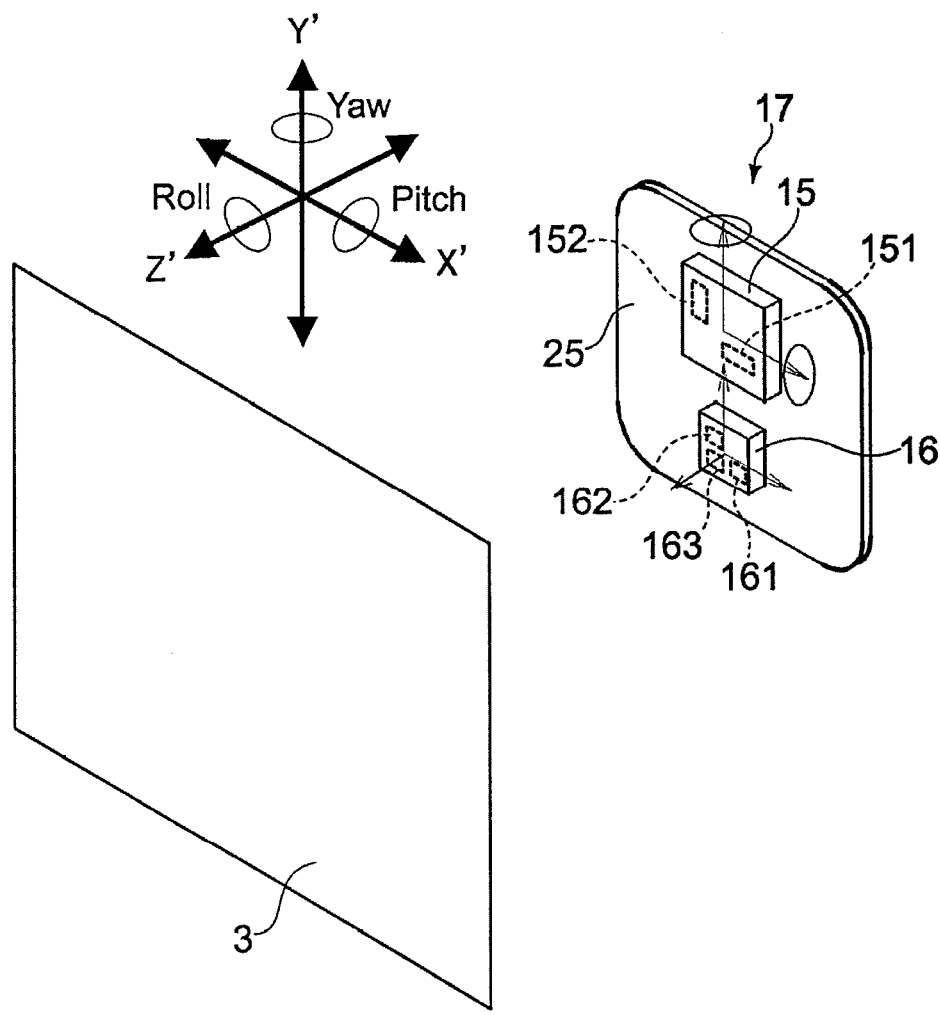
FIG. 5 A perspective diagram showing a sensor unit.

FIG. 5 is a perspective diagram showing the sensor unit 17.

The acceleration sensor unit 16 of the sensor unit 17 includes three sensors, that is, a first acceleration sensor 161, a second acceleration sensor 162, and a third acceleration sensor 163. Further, the angular velocity sensor unit 15 of the sensor unit 17 includes two sensors, that is, a first angular velocity sensor 151 and a second angular velocity sensor 152. The acceleration sensor unit 16 and the angular velocity sensor unit 15 are packaged and mounted on a circuit board 25.

As each of the first and second angular velocity sensors 151 and 152, a vibration gyro sensor for detecting Coriolis force in proportion to an angular velocity is used. As each of the first, second, and third acceleration sensors 161, 162, and 163, any sensor such as a piezoresistive sensor, a piezoelectric sensor, or a capacitance sensor may be used.

The sensor unit 17 is incorporated into the casing 10 such that a surface of the circuit board 25 on which the acceleration sensor unit 16 and the angular velocity sensor unit 15 are mounted (acceleration detection surface) becomes substantially parallel to an X'-Y' plane. As described above, the acceleration sensor unit 16 detects physical amounts with respect to the three axes, that is, the X' axis, the Y' axis, and the Z' axis, and the angular velocity sensor unit 15 detects physical amounts with respect to the two axes, that is, the X' axis and the Y' axis. In the specification, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. Further, in descriptions below, with regard to the movement of the input apparatus 1, a rotational direction about the X'-axis direction is sometimes referred to as pitch direction, a rotational direction about the Y'-axis direction is sometimes referred to as yaw direction, and a rotational direction about the Z'-axis direction is sometimes referred to as roll direction.

Figure 6:
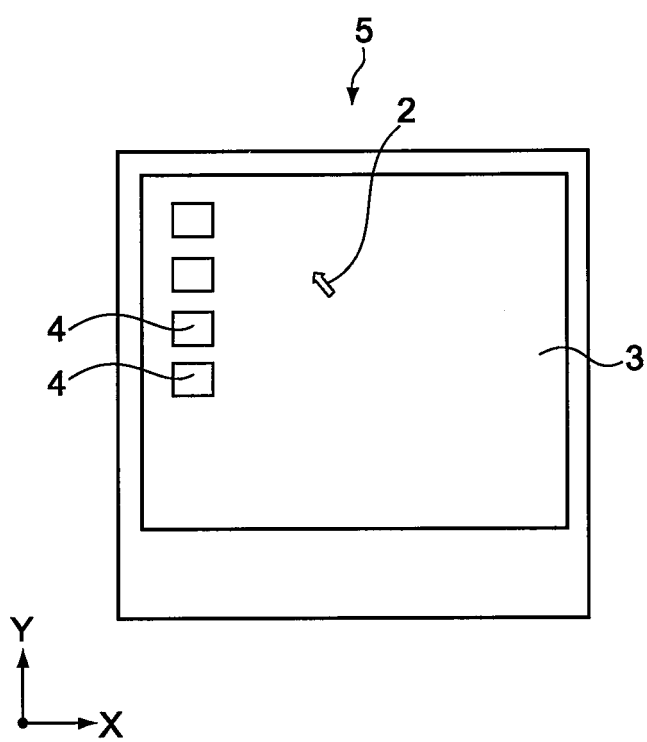
FIG. 6 A diagram showing an example of a screen displayed on a display apparatus.

FIG. 6 is a diagram showing an example of the screen 3 displayed on the display apparatus 5. Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like, or an apparatus in which such a display and the control apparatus 40 are integrated.

UIs such as the icons 4 and the pointer 2 are displayed on the screen 3. The icons are images on the screen 3 representing functions of programs, execution commands, file contents, and the like of the computer. It should be noted that on the screen 3, the horizontal direction is referred to as X-axis direction and the vertical direction is referred to as Y-axis direction.

Figure 7:
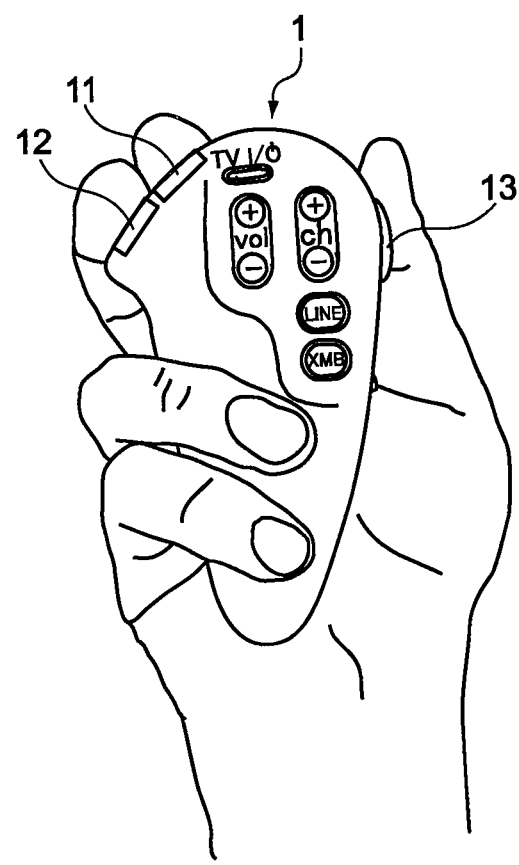
FIG. 7 A diagram showing a state where a user is holding the input apparatus.

FIG. 7 is a diagram showing a state where a user is holding the input apparatus 1. As shown in FIG. 7, the input apparatus 1 may include, in addition to the buttons 11, 12, and 13, operation sections including various operation buttons such as those provided to a remote controller for operating a television or the like and a power supply switch, for example. When the user moves the input apparatus 1 in the air, moves it on a desk or the like, or operates the operation sections while holding the input apparatus 1 as shown in the figure, input information thereof is output to the control apparatus 40, and the control apparatus 40 controls the UI.

Figure 8:
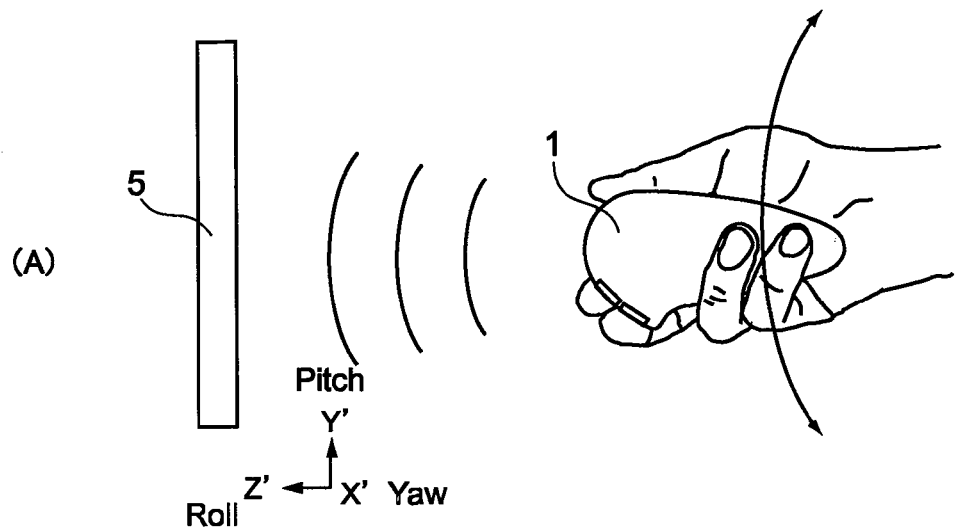
FIG. 8 Explanatory diagrams for illustrating typical examples of ways of moving the input apparatus and ways a pointer moves on the screen accordingly.
Figure 8:
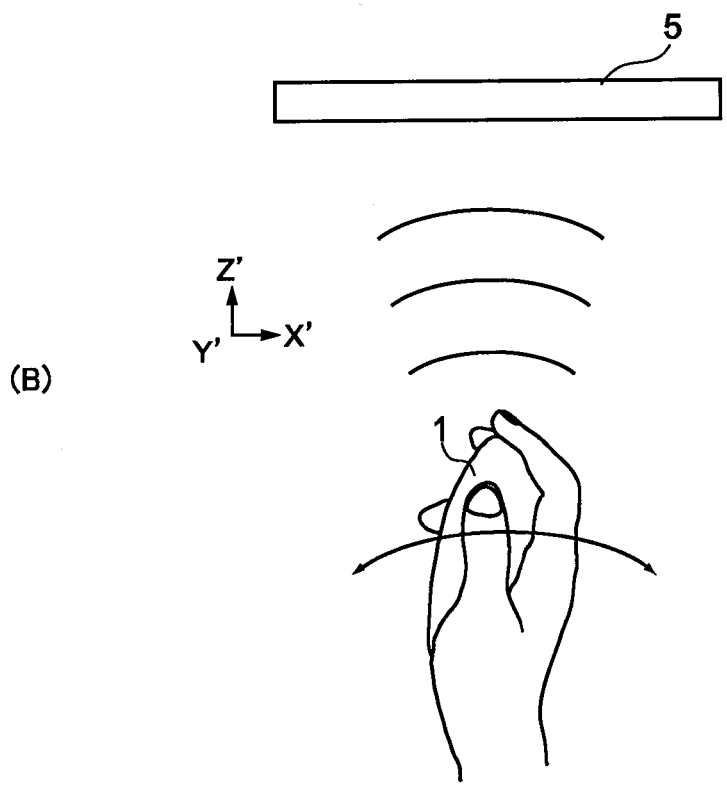

Next, a description will be given on typical examples of ways of moving the input apparatus 1 and ways the pointer 2 moves on the screen 3 accordingly. FIG. 8 are explanatory diagrams therefor.

As shown in FIGS. 8A and 8B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 (see FIG. 5) of the sensor unit 17 is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 8A and 8B will be referred to as reference position.

As shown in FIG. 8A, in the reference position, the user moves a wrist or an arm in the vertical direction, that is, swings it in the pitch direction. At this time, the second acceleration sensor 162 detects an acceleration ($a_y$) in the Y'-axis direction and the first angular velocity sensor 151 detects an angular velocity ($\omega_x$) about the X' axis (see FIG. 5). Based on those detection values, the control apparatus 40 controls display of the pointer 2 so as to move the pointer 2 in the Y-axis direction.

Meanwhile, as shown in FIG. 8B, in the reference position, the user moves the wrist or the arm in the lateral direction, that is, swings it in the yaw direction. At this time, the first acceleration sensor 161 detects an acceleration ($a_x$) in the X'-axis direction and the second angular velocity sensor 152 detects an angular velocity ($\omega_y$) about the Y' axis (see FIG. 5). Based on those detection values, the control apparatus 40 controls display of the pointer 2 so as to move the pointer 2 in the X-axis direction.

Although descriptions will be given later, in one embodiment, the MPU 19 of the input apparatus 1 calculates velocity values in the yaw and pitch directions based on the detection values detected by the sensor unit 17, in accordance with programs stored in the built-in nonvolatile memory. In this case, mainly the MPU 19 of the input apparatus 1 calculates velocity information. Here, for controlling the movement of the pointer 2, a dimension of integration values (velocities) of triaxial acceleration values detected by the acceleration sensor unit 16 is used. Then, input information of the velocity dimension is transmitted to the control apparatus 40.

In another embodiment, the input apparatus 1 transmits, as the input information, physical amounts detected by the angular velocity sensor unit 15 and the like to the control apparatus 40. In this case, the MPU 35 of the control apparatus 40 calculates the velocity values in the X'- and Y'-axis directions based on the received input information in accordance with the program stored in the ROM 37, and controls display so that the pointer 2 moves in accordance with the velocity values (see FIG. 14).

In a 3-dimensional operation mode to be described later, the control apparatus 40 converts a displacement in the yaw direction per unit time into a displacement amount of the pointer 2 on the X axis on the screen 3, and converts a displacement in the pitch direction per unit time into a displacement amount of the pointer 2 on the Y axis on the screen 3. In a planar operation mode to be described later, the control apparatus 40 converts a displacement in the yaw direction per unit time into a displacement amount of the pointer 2 on the X axis on the screen 3, and converts a displacement in the roll direction per unit time into a displacement amount of the pointer 2 on the Y axis on the screen 3. Accordingly, the pointer 2 is moved. Typically, regarding the velocity values supplied every predetermined number of clocks, the MPU 35 of the control apparatus 40 adds an n-th velocity value that has been supplied to a (n−1)-th velocity value that has been supplied. Accordingly, the n-th velocity value that has been supplied corresponds to the displacement amount of the pointer 2, and coordinate information of the pointer 2 on the screen 3 is generated. In this case, mainly the MPU 35 of the control apparatus 40 calculates coordinate information.

The method of calculating displacement amounts can similarly be applied to an integration of the acceleration values in calculating the velocity values.

Figure 9:
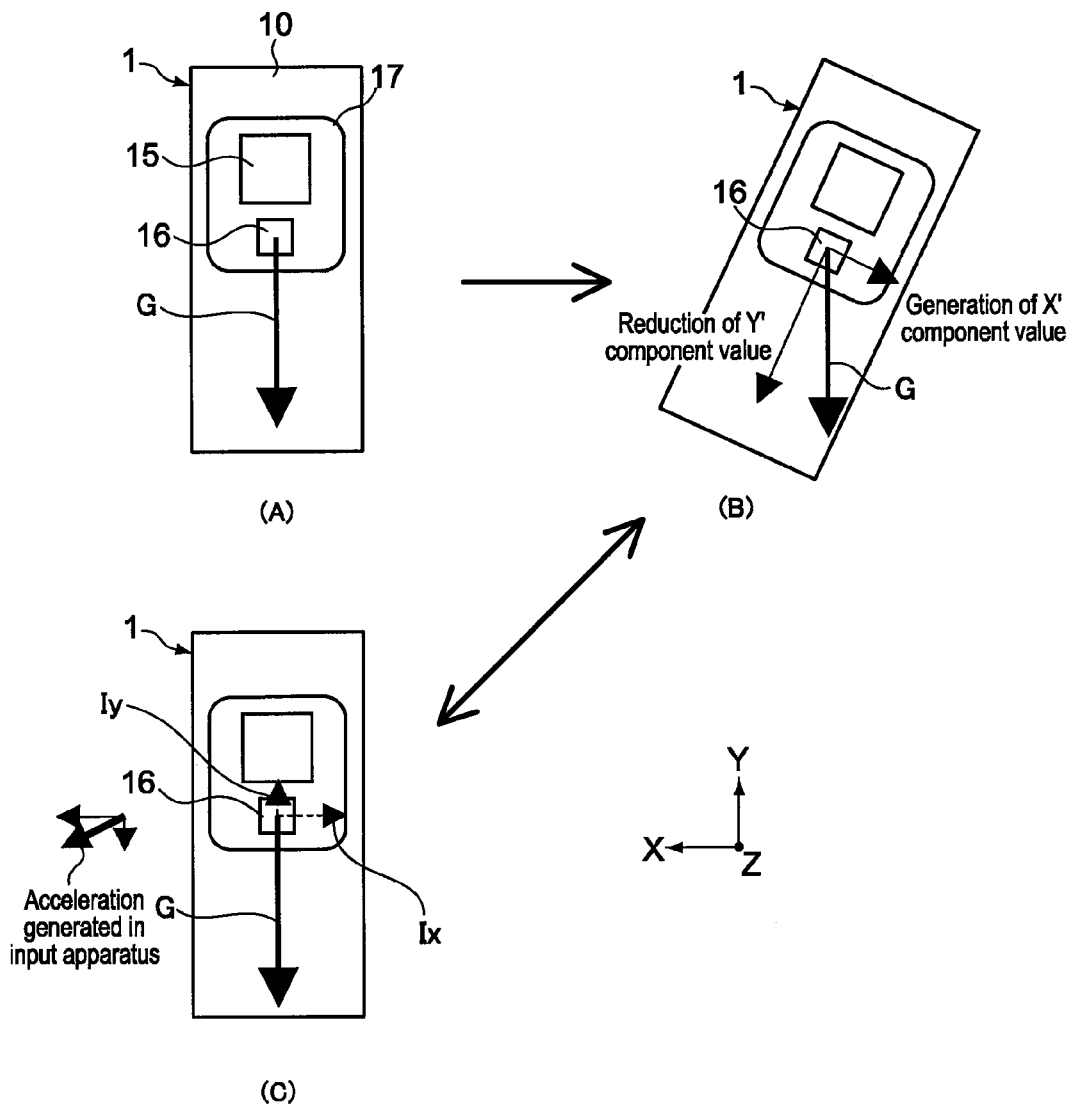
FIG. 9 Diagrams for illustrating a gravitational effect with respect to an acceleration sensor unit.
Figure 10:
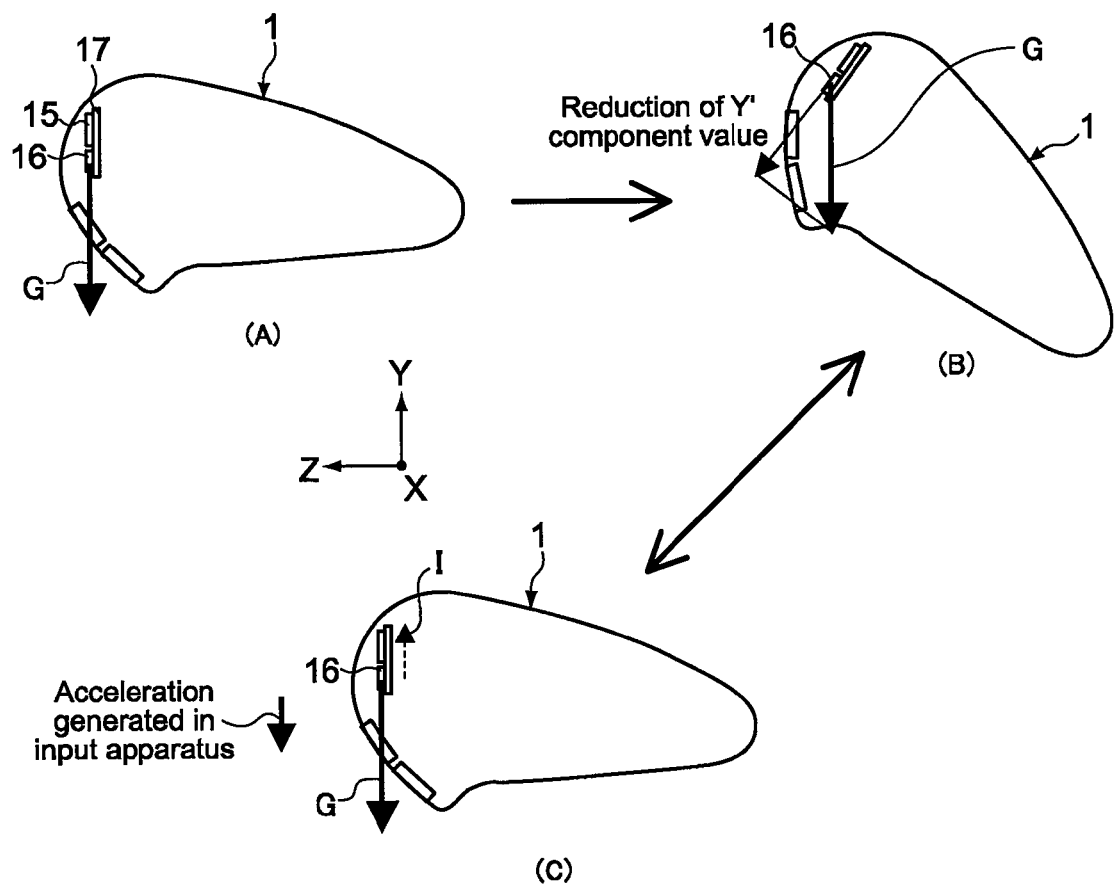
FIG. 10 Other diagrams for illustrating the gravitational effect with respect to the acceleration sensor unit.

Next, a description will be given on a gravitational effect with respect to the acceleration sensor unit 16. FIGS. 9 and 10 are explanatory diagrams therefor. FIG. 9 are diagrams showing the input apparatus 1 seen from the Z direction, and FIG. 10 are diagrams showing the input apparatus 1 seen from the X direction.

In FIG. 9A, the input apparatus 1 is in the reference position and is held still. At this time, an output of the first acceleration sensor 161 is substantially 0, and an output of the second acceleration sensor 162 is an output corresponding to a gravity acceleration G. However, as shown in FIG. 9B, for example, in a state where the input apparatus 1 is tilted in the roll direction, the first and second acceleration sensors 161 and 162 respectively detect acceleration values of tilt components of the gravity acceleration G.

In this case, the first acceleration sensor 161 detects the acceleration in the X'-axis direction even when the input apparatus 1 is not actually moved in the X-axis direction in particular. The state shown in FIG. 9B is equivalent to a state where, when the input apparatus 1 is in the reference position as shown in FIG. 9C, the acceleration sensor unit 16 has received inertial forces Ix and Iy as respectively indicated by arrows with broken lines, thus being undistinguishable by the acceleration sensor unit 16. As a result, the acceleration sensor unit 16 judges that an acceleration in a downward left-hand direction as indicated by an arrow is applied to the input apparatus 1 and outputs a detection signal different from the actual movement of the input apparatus 1. In addition, because the gravity acceleration G constantly acts on the acceleration sensor unit 16, an integration value is increased and an amount by which the pointer 2 is displaced in the downward oblique direction is increased at an accelerating pace. When the state is shifted from that shown in FIG. 9A to that shown in FIG. 9B, it is considered that inhibition of the movement of the pointer 2 on the screen 3 is an operation that intrinsically matches the intuition of the user.

The same holds true also when the input apparatus 1 is rotated in the pitch direction from the reference position as shown in FIG. 10A to tilt as shown in FIG. 10B, for example. In such a case, because the gravity acceleration G detected by the second acceleration sensor 162 at the time the input apparatus 1 is in the reference position decreases, the input apparatus 1 cannot make a distinguishment from the inertial force I in the pitch direction as shown in FIG. 10C.

Figure 11:
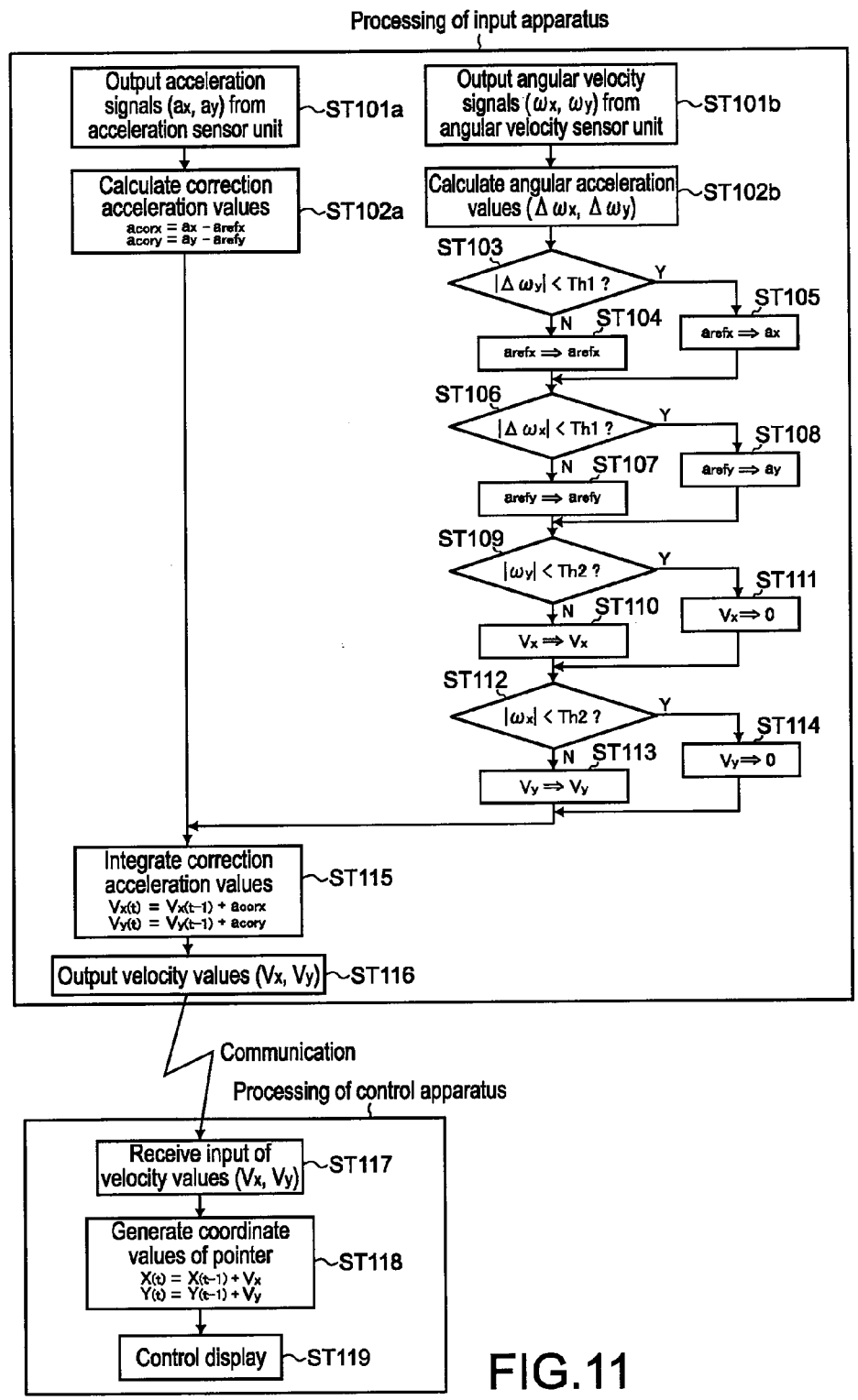
FIG. 11 A flowchart showing an operation of calculating velocity values of the input apparatus using angular velocity values detected by an angular velocity sensor unit.

To reduce such a gravitational effect with respect to the acceleration sensor unit 16 as much as possible, the input apparatus 1 of this embodiment calculates the velocity values of the input apparatus 1 using the angular velocity values detected by the angular velocity sensor unit 15. Hereinafter, this operation will be described. FIG. 11 is a flowchart showing the operation.

Power of the input apparatus 1 is turned on. For example, the user turns on a power supply switch or the like provided to the input apparatus 1 or the control apparatus 40 to turn on the power of the input apparatus 1. Upon turning on the power, acceleration signals (first and second acceleration values $a_x$ and $a_y$) are output from the acceleration sensor unit 16 (Step 101a) to be supplied to the MPU 19. The acceleration signals are signals corresponding to the position of the input apparatus 1 at a point when the power is turned on (hereinafter, referred to as initial position).

There are cases where the initial position is the reference position. However, a position at which the entire amount of the gravity acceleration is detected in the X-axis direction, that is, a position at which the output of the first acceleration sensor 161 is the acceleration value corresponding to the gravity acceleration and the output of the second acceleration sensor 162 is 0 is also possible. As a matter of course, as the initial position, a position tilted as shown in FIG. 9B is also possible.

The MPU 19 of the input apparatus 1 acquires the acceleration signals ($a_x$, $a_y$) from the acceleration sensor unit 16 every predetermined number of clocks. Upon acquisition of the second acceleration signals ($a_x$, $a_y$) and the subsequent acceleration signals, the MPU 19 carries out the following operation to remove the gravitational effect. Specifically, as in Equations (1) and (2) below, the MPU 19 subtracts previously-detected gravity acceleration components (first $a_x$ ($=a_{refx}$) and $a_y$ ($=a_{refy}$)) in the X- and Y-axis directions from the currently-obtained acceleration values $a_x$ and $a_y$, respectively, to thereby generate a first correction acceleration value $a_{corx}$ and a second correction acceleration value $a_{cory}$. (Step 102a).

$$a_{corx}=a_x-a_{refx} \quad (1)$$

$$a_{cory}=a_y-a_{refy} \quad (2)$$

Hereinafter, $a_{refx}$ and $a_{refy}$ will be referred to as reference acceleration value on the X axis and reference acceleration value on the Y axis (first reference acceleration value and second reference acceleration value), respectively. $a_{refx}$ and $a_{refy}$ used in the first calculation of Step 102a since turning on of the power are acceleration signals $a_x$ and $a_y$ detected right after the turning on of the power.

As shown in Equations (3) and (4), the MPU 19 calculates a first velocity value $V_x$ and a second velocity value $V_y$ by respectively adding the first and second correction acceleration values $a_{corx}$ and $a_{cory}$, that is, by an integration operation (Step 115).

$$V_x(t)=V_x(t-1)+a_{corx} \quad (3)$$

$$V_y(t)=V_y(t-1)+a_{cory} \quad (4)$$

$V_x(t)$ and $V_y(t)$ represent the currently-obtained velocity values and $V_x(t-1)$ and $V_y(t-1)$ represent previously-obtained velocity values.

Meanwhile, as described above, upon turning on the power of the input apparatus 1, biaxial angular velocity signals (first and second angular velocity values $\omega_x$ and $\omega_y$) are output from the angular velocity sensor unit 15 (Step 101b) to be supplied to the MPU 19. Upon acquiring the signals, the MPU 19 calculates angular acceleration values (first angular acceleration value $\Delta\omega_x$ and second angular acceleration value $\Delta\omega_y$) by a differentiation operation (Step 102b).

The MPU 19 judges whether absolute values $|\Delta\omega_x|$ and $|\Delta\omega_y|$ of $\Delta\omega_x$ and $\Delta\omega_y$ above are smaller than a threshold value Th1 (Steps 103 and 106). When $|\Delta\omega_y|\geq$Th1, the MPU 19 uses the first reference acceleration value $a_{refx}$ as it is and does not update it (Step 104). Similarly, when $|\Delta\omega_x|\geq$Th1, the MPU 19 uses the second reference acceleration value $a_{refy}$ as it is and does not update it (Step 107).

A value close to 0 is set as the threshold value Th1. The threshold value Th1 takes into account the angular velocity values that are detected due to a hand movement of the user, a DC offset, or the like even when the user is consciously holding the input apparatus 1 still. Thus, the pointer 2 is prevented from being moved during display due to a hand movement or a DC offset in the case where the user is consciously holding the input apparatus 1 still.

Reasons for performing the processing as described above are as follows.

Figure 12:
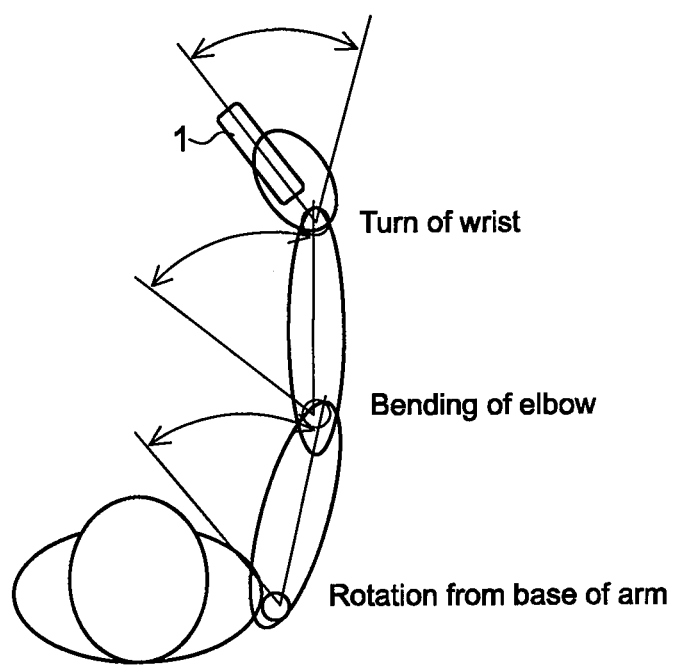
FIG. 12 A top view of a user operating the input apparatus.

FIG. 12 is a top view of the user operating the input apparatus 1. When the user operates the input apparatus 1 naturally, the operation is made by at least one of a rotation from a base of an arm, bending of an elbow, and a turn of a wrist. Therefore, generation of the acceleration leads to generation of the angular acceleration. Specifically, the acceleration is assumed to be subservient to the angular acceleration generated in the same direction as the acceleration. Therefore, by the MPU 19 monitoring the second angular acceleration value $|\Delta\omega_y|$, it is possible to judge whether to update the first reference acceleration value $a_{refx}$ in the same direction, and judge whether to eventually correct the first correction acceleration value $a_{corx}$ from Equation (1). The same holds true for the first angular acceleration value $|\Delta\omega_x|$.

More specifically, when the second angular acceleration value $|\Delta\omega_y|$ is equal to or larger than the threshold value Th1, the MPU 19 judges that the input apparatus 1 is moving in the yaw direction. In this case, the MPU 19 does not update the first reference acceleration value $a_{refx}$ and eventually does not correct the first correction acceleration value $a_{corx}$, and continues on with the integration operation of Equation (3) based on $a_{corx}$.

Further, when the first angular acceleration value $|\Delta\omega_x|$ is equal to or larger than the threshold value Th1, the MPU 19 judges that the input apparatus 1 is moving in the pitch direction. In this case, the MPU 19 does not update the second reference acceleration value $a_{refy}$ and eventually does not correct the second correction acceleration value $a_{cory}$, and continues on with the integration operation of Equation (4) based on $a_{cory}$.

Meanwhile, when the second angular acceleration value $|\Delta\omega_y|$ is smaller than the threshold value Th1 in Step 103, the MPU 19 judges that the input apparatus 1 is not moved in the yaw direction. In this case, the MPU 19 updates the first reference acceleration value $a_{refx}$ to the currently-obtained (latest) detection value $a_x$, to thereby correct the first correction acceleration value $a_{corx}$ using Equation (1) (Step 105). The latest detection value $a_x$ is a detection value obtained while the input apparatus 1 is held almost still, thus being a component value of the gravity acceleration.

Similarly, when the first angular acceleration value $|\Delta\omega_x|$ is smaller than the threshold value Th1 in Step 106, the MPU 19 judges that the input apparatus 1 is not moved in the pitch direction. In this case, the MPU 19 updates the second reference acceleration value $a_{refy}$ to the currently-obtained (latest) detection value $a_y$, to thereby correct the second correction acceleration value $a_{cory}$ using Equation (2) (Step 108).

It should be noted that in this embodiment, the threshold values in the yaw direction and the pitch direction have been set as the same threshold value Th1. However, different threshold values may be used for those directions.

In the above description, the angular acceleration values $\Delta\omega_x$ and $\Delta\omega_y$ have been monitored, but the MPU 19 can also monitor the angular velocity values $\omega_x$ and $\omega_y$ to correct the velocity values calculated in Equations (3) and (4). Based on the idea of FIG. 12, assuming that generation of the velocity leads to generation of the angular velocity, it can be assumed that the velocity is subservient to the angular velocity in the same direction as the velocity.

Specifically, when the absolute value of the second angular velocity value $|\omega_y|$ is equal to or larger than a threshold value Th2 (NO in Step 109), the MPU 19 judges that the input apparatus 1 is moving in the yaw direction. In this case, the MPU 19 does not correct the first velocity value $V_x$ (Step 110). The same holds true for the absolute value of the first angular velocity value $|\omega_x|$ (NO in Step 112, and Step 113).

The threshold value Th2 also only needs to be set in the same manner as the threshold value Th1.

On the other hand, when the absolute value of the second angular velocity value $|\omega_y|$ is smaller than the threshold value Th2 (YES in Step 109), the MPU 19 judges that the input apparatus 1 is not moved in the yaw direction. In this case, the MPU 19 corrects the first velocity value $V_x$ to, for example, 0 to reset the value (Step 111). The same holds true for the absolute value of the first angular velocity value $|\omega_x|$ (YES in Step 112, and Step 114).

The MPU 19 thus outputs the velocity values $V_x$ and $V_y$ (spatial velocity values) in both directions, and the transceiver 21 outputs input information regarding the velocity values to the control apparatus 40 (Step 116).

The MPU 35 of the control apparatus 40 receives the input of the velocity values $V_x$ and $V_y$ as the input information (Step 117). The MPU 35 generates coordinate values X and Y of the pointer 2 that correspond to the velocity values $V_x$ and $V_y$ as shown in Equations (5) and (6) below (Step 118) and controls display so that the pointer 2 moves on the screen 3 (Step 119).

$$X(t)=X(t-1)+V_x \tag{5}$$

$$Y(t)=Y(t-1)+V_y \tag{6}$$

As described above, the reference acceleration values $a_{refx}$ and $a_{refy}$ are updated and the correction acceleration values $a_{corx}$ and $a_{cory}$ are corrected when the input apparatus 1 is held almost still, with the result that the gravitational effect with respect to the acceleration sensor unit 16 can be suppressed. In addition, because the correction acceleration values $a_{corx}$ and $a_{cory}$ are corrected by Equations (1) and (2) upon update of the reference acceleration values $a_{refx}$ and $a_{refy}$, a DC level is also corrected, thereby solving the problem regarding the DC offset. Further, because the velocity values are corrected so as to be reset to 0 when the input apparatus 1 is held almost still, integration errors can also be suppressed. When an integration error occurs, a phenomenon in which the pointer 2 moves on the screen 3 irrespective of the fact that the user has stopped moving the input apparatus 1 occurs.

Figure 13:
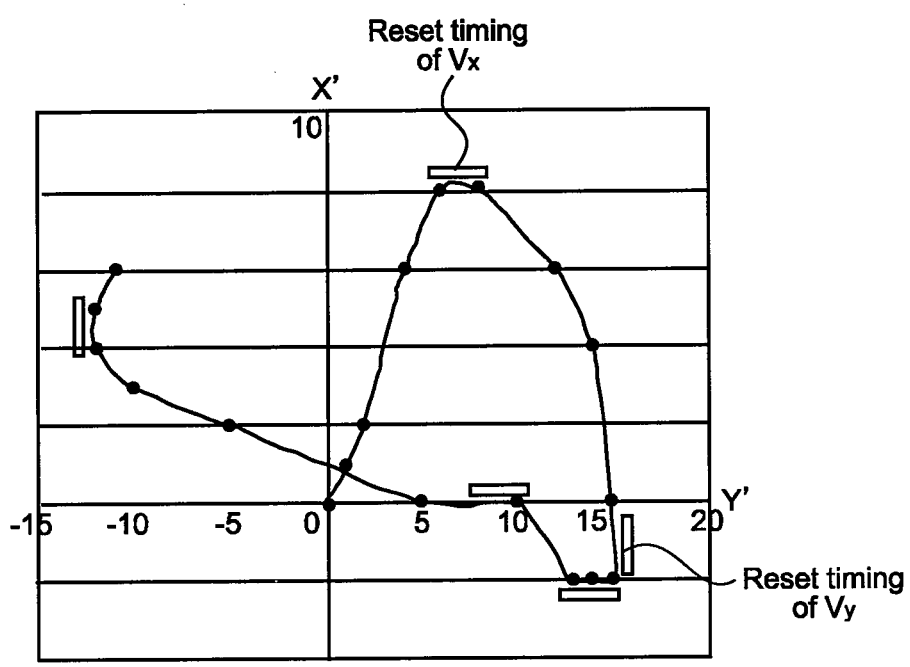
FIG. 13 A diagram showing a trajectory of the input apparatus seen from a plane formed by an X axis and a Y axis.

Moreover, in this embodiment, because the first reference acceleration value $a_{refx}$ and the second reference acceleration value $a_{refy}$ are updated individually, when even one of the angular acceleration values in the yaw direction and the pitch direction becomes smaller than the threshold value, a correction thereof is performed. Therefore, it is possible to update the first reference acceleration value $a_{refx}$ or the second reference acceleration value $a_{refy}$ with a time interval short enough for practical use. The same holds true for the individual corrections of the first velocity value $V_x$ and the second velocity value $V_y$. FIG. 13 is an explanatory diagram to help understand the above description.

FIG. 13 shows a trajectory of the input apparatus 1 seen from a plane formed by the X' axis and the Y' axis. $V_x$ is reset to 0 if the angular velocity value $\omega_y$ in the yaw direction is substantially 0 (smaller than threshold value Th2). $V_y$ is reset to 0 if the angular velocity value $\omega_x$ in the pitch direction is substantially 0 (smaller than threshold value Th2).

In the related art, in order to reduce the gravitational effect, there has also been, in addition to an input apparatus 1 including six sensors, an apparatus that detects a change in a gravity vector per unit time using triaxial acceleration sensors to recognize roll and pitch angular velocities as XY displacement amounts. Although there is no problem concerning the Y-axis direction, because this apparatus is of a type that moves the pointer 2 in the X-axis direction based only on the twist or turn of a wrist of the user in the roll direction, the operation does not match the intuition of the user.

Figure 14:
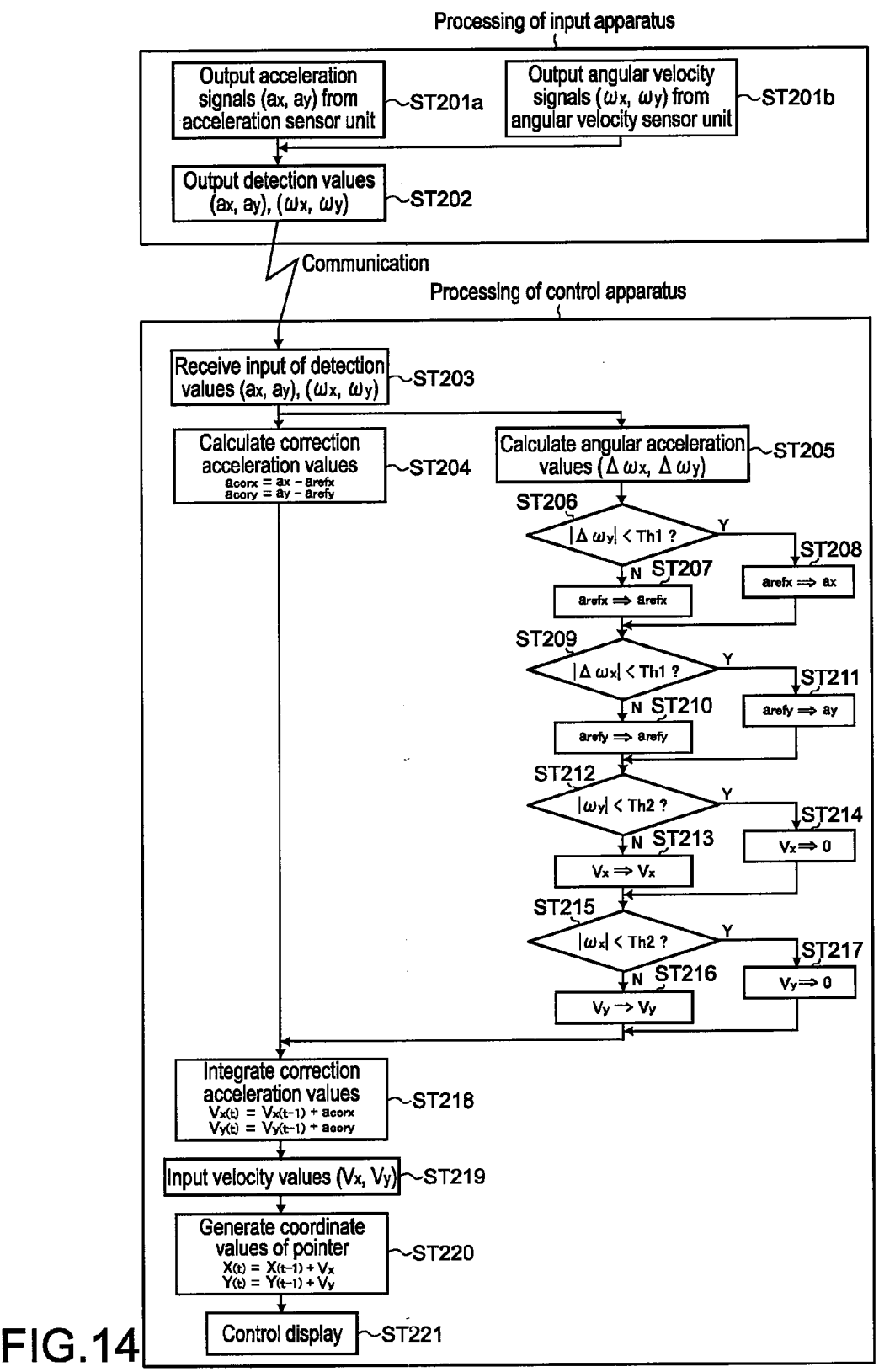
FIG. 14 A flowchart showing another embodiment.

FIG. 14 is a flowchart showing another embodiment described above. In the flowchart, the input apparatus 1 outputs, as the input information, to the control apparatus 40, the acceleration signals and angular velocity signals output from the sensor unit 17. The MPU 35 of the control apparatus 40 executes Steps 102a and 102b to 115 shown in FIG. 11 in Steps 204 to 218. Because details thereof are the same as those of FIG. 11, descriptions thereof will be omitted (the same holds true hereinbelow).

The input apparatus 1 may be, for example, a remote controller used for remotely operating a television or the like or an input apparatus for a game device.

Next, a switch operation of modes (3-dimensional operation mode and planar operation mode) of the input apparatus 1 will be described.

Figure 15:
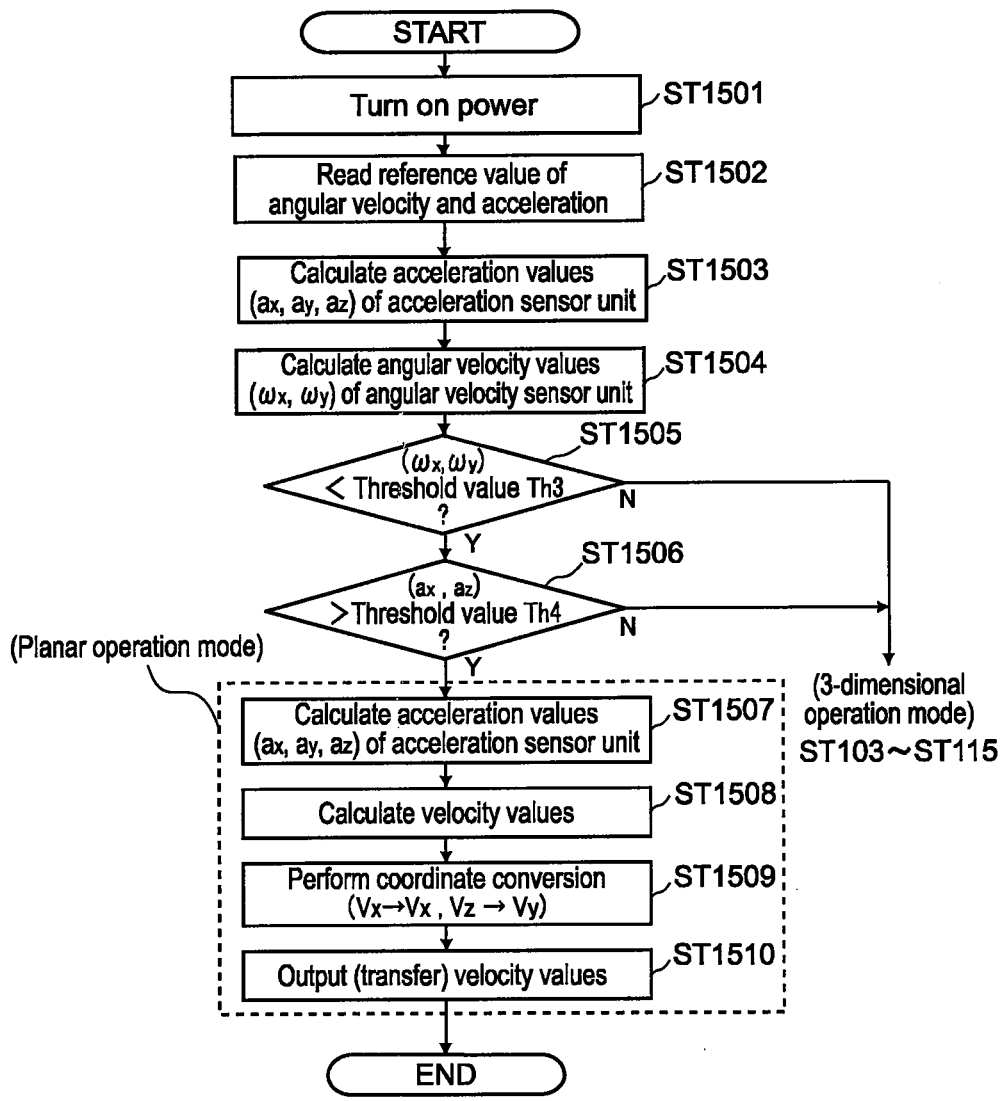
FIG. 15 A flowchart showing a switch operation of input operation modes (3-dimensional operation mode and planar operation mode) of the input apparatus.
Figure 16:
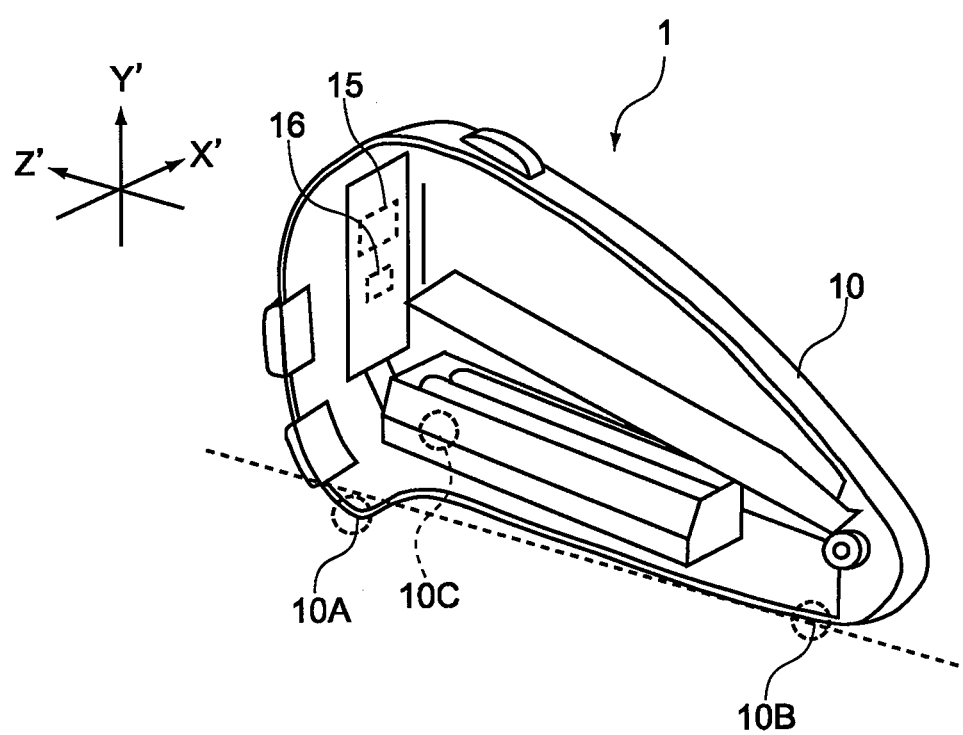
FIG. 16 A diagram showing a state where the input apparatus is placed on a plane.

FIG. 15 is a flowchart showing the switch operation of input operation modes (3-dimensional operation mode and planar operation mode) of the input apparatus 1, and FIG. 16 is a diagram showing a state where the input apparatus 1 is placed on a plane. As shown in FIG. 16, the input apparatus 1 is operated on the plane while bottom portions 10A, 10B, and 10C thereof are in contact with an X'Z' plane, for example. The bottom portion 10C is a bottom portion of a part of the input apparatus 1 that is not shown in FIG. 16.

As shown in FIG. 15, a switch (power supply) (not shown) is turned on first (ST 1501), and a reference 0 voltage recorded in the built-in nonvolatile memory of the MPU 19 is read as a reference value (ST 1502). Due to individual differences in output voltage values of the acceleration sensor and the angular velocity sensor at a time when the acceleration or the angular velocity is 0, a reference 0 voltage subjected to a calibration in a production adjustment process in factories is used as a reference.

Next, acceleration signals are obtained from the acceleration sensor unit 16 as shown in Step 101a of FIG. 11, and acceleration values ($a_x$, $a_y$, $a_z$) are calculated (ST 1503).

Next, angular velocity signals are obtained from the angular velocity sensor unit 15 as shown in Step 101b of FIG. 11, and angular velocity values ($\omega_x$, $\omega_y$) are calculated (ST 1504).

Subsequently, for judging whether the input apparatus 1 is operated while being placed on the plane as shown in FIG. 16, the MPU 19 judges whether both of the angular velocity values ($\omega_x$, $\omega_y$) obtained in Step 1504 are smaller than a threshold value Th3 (ST 1505) (judgment means). A value close to 0 is set as the threshold value Th3 since a relatively-small angular velocity is generated even within the plane.

When at least one of the angular velocity values ($\omega_x$, $\omega_y$) is equal to or larger than the threshold value Th3 in Step 1505 (negative judgment in ST 1505), it is judged that the input apparatus 1 is operated 3-dimensionally, and the 3-dimensional operation mode (ST 103 to ST 115) shown in FIG. 11 is executed.

On the other hand, when both of the angular velocity values ($\omega_x$, $\omega_y$) are smaller than the threshold value Th3 in Step 1505 (positive judgment in ST 1505), it is judged that the input apparatus 1 is not rotated about the X' axis and the Y' axis.

In the case of the positive judgment in ST 1505, the MPU 19 judges whether at least one of the acceleration values ($a_x$, $a_z$) is larger than a threshold value Th4 in Step 1506 (judgment means).

When at least one of the acceleration values ($a_x$, $a_z$) is larger than the threshold value Th4 in Step 1506 (positive judgment in ST 1506), it can be judged that an acceleration movement is made in at least one of the X'- and Z'-axis directions on the X'Z' plane shown in FIG. 16. Therefore, the MPU 19 judges that the input apparatus 1 is operated on the X'Z' plane shown in FIG. 16, and executes the planar operation mode of Step 1507 and subsequent steps (switch means).

When both of the acceleration values ($a_x$, $a_z$) are equal to or smaller than the threshold value Th4 in Step 1506, the MPU 19 judges that the input apparatus 1 is not moving on the X'Z' plane shown in FIG. 16, and executes the 3-dimensional operation mode (ST 103 to ST 115) without shifting to the planar operation mode (switch means).

When it is judged that the input apparatus 1 is in the planar operation mode by (the positive judgment of) Step 1505 and (the positive judgment of) Step 1506, the following processes indicated by a broken line of FIG. 15 are executed.

First, the MPU 19 obtains the acceleration values ($a_x$, $a_y$, $a_z$) of the input apparatus 1 at the time of the planar operation, and calculates the acceleration values ($a_x$, $a_y$, $a_z$) as described above (ST 101a to ST 114 in FIG. 11).

Next, the MPU 19 calculates the velocity values ($V_x$, $V_z$) (plane velocity values) by integrating the acceleration values as shown in FIG. 11 (ST 1508).

The MPU 19 obtains (associates) the velocity value $V_x$ of the pointer 2 in the X-axis direction on the screen 3 shown in FIG. 6 based on the velocity value $V_x$ of the input apparatus 1 in the X' direction on the X'Z' plane shown in FIG. 16, and obtains (associates) the velocity value $V_y$ of the pointer 2 in the Y-axis direction on the screen 3 shown in FIG. 6 based on the velocity value $V_z$ of the input apparatus 1 in the Z' direction on the X'Z' plane shown in FIG. 16 (ST 1509).

Accordingly, the movement of the input apparatus 1 in the X' direction on the X'Z' plane shown in FIG. 16 corresponds to the movement of the pointer 2 on the screen 3 in the X direction, and the movement of the input apparatus 1 in the Z' direction on the X'Z' plane shown in FIG. 16 corresponds to the movement of the pointer 2 on the screen 3 in the Y direction.

The MPU 19 outputs the converted velocity values $V_x$ and $V_y$ to the control apparatus 40 (ST 1510).

This embodiment has shown the example where the velocity value $V_x$ of the pointer 2 in the X-axis direction on the screen 3 is obtained based on the velocity value $V_x$ of the input apparatus 1 on the X'Z' plane of FIG. 16, and the velocity value $V_y$ of the pointer 2 in the Y-axis direction on the screen 3 is obtained based on the velocity value $V_z$ of the input apparatus 1 on the X'Z' plane of FIG. 16 (ST 1509). However, it is also possible to obtain the acceleration value of the pointer 2 in the X-axis direction on the screen 3 based on the acceleration value $a_x$ of the input apparatus 1 on the X'Z' plane of FIG. 16, and obtain the acceleration value of the pointer 2 in the Y-axis direction on the screen 3 based on the acceleration value $a_z$ of the input apparatus 1 on the plane.

The angular velocity obtained when the user moves the input apparatus 1 3-dimensionally is sufficiently larger than the angular velocity obtained when the input apparatus 1 is moved on the plane. This is because, when a human being moves the input apparatus 1 naturally, the input apparatus is moved rotationally using at least one of a wrist, an elbow, and a shoulder as a rotational axis as shown in FIG. 12.

As described above, according to this embodiment, the input apparatus 1 includes the angular velocity sensor unit 15 and the acceleration sensor unit 16, and by setting the threshold value Th3 (threshold value Th3 of ST 1505) for the angular velocity values ($\omega_x$, $\omega_y$) detected by the angular velocity sensor unit 15, it is possible to make a switch between the planar operation mode and the 3-dimensional operation mode based on whether the angular velocity values ($\omega_x$, $\omega_y$) are smaller than the threshold value Th3 (ST 1505) (and whether at least one of the acceleration values ($a_x$, $a_z$) is larger than the threshold value Th4 (ST 1506)). Therefore, the planar operation mode and the 3-dimensional operation mode can be switched therebetween without having to use a sensor other than the acceleration sensor unit 16 and the angular velocity sensor unit 15 (without an increase in the number of components).

Because it is unnecessary to use an optical device for an optical mouse, a ball-type mechanical encoder, or the like in addition to the acceleration sensor unit 16 and the angular velocity sensor unit 15 for making a switch between the planar operation mode and the 3-dimensional operation mode, it is possible to lower costs as well as enhance a degree of freedom in design of the input apparatus 1. Moreover, since an increase in the number of components can be suppressed, an average failure rate of the input apparatus 1 can be lowered.

The velocity value $V_x$ of the pointer 2 in the X-axis direction on the screen 3 is obtained based on the velocity value $V_x$ of the input apparatus 1 in the X' direction on the X'Z' plane of FIG. 16, and the velocity value $V_y$ of the pointer 2 in the Y-axis direction on the screen 3 is obtained based on the velocity value $V_z$ of the input apparatus 1 on the X'Z' plane of FIG. 16 (ST 1509). Accordingly, by moving the input apparatus 1 in the X'-axis direction on the X'Z' plane of FIG. 16, the pointer 2 can be moved in the lateral direction on the screen 3 shown in FIG. 6. By moving the input apparatus 1 in the Z'-axis direction (depth direction) on the X'Z' plane of FIG. 16, the pointer 2 can be moved vertically on the screen 3 shown in FIG. 6.

The first acceleration sensor 161, the second acceleration sensor 162, and the third acceleration sensor 163 of the input apparatus 1 respectively detect accelerations in the X'-, Y'-, and Z'-axis directions that are mutually orthogonal. Thus, it is possible to accurately detect the accelerations in the X'-, Y'-, and Z'-axis directions during the 3-dimensional operation mode. Therefore, it is possible to accurately execute the judgment in Step 1506 and accurately execute the switch between the planar operation mode and the 3-dimensional operation mode.

Regarding the judgment on whether the input apparatus 1 is operated 3-dimensionally, it is also possible that the processes of Steps 1502 to 1506 be repeated a predetermined number of times, and the switch be made to the operation mode corresponding to a judgment result when the same judgment result is consecutively obtained for over a predetermined time period. For example, there are cases where, when the input apparatus reaches an end portion of an operation plane during the planar operation, the input apparatus 1 is lifted and moved to the vicinity of the center of the operation plane. In this case, there is a fear that the input apparatus 1 is misjudged as being operated 3-dimensionally based on the flow of FIG. 15. In this regard, by switching the operation mode only when the same judgment result is consecutively obtained for over a predetermined time period as described above, the misjudgment can be avoided. Accordingly, a highly-reliable operation mode switch can be realized.

It is also possible for the MPU 19 to judge that the input apparatus 1 is placed on the plane in the case of the positive judgment in Step 1505, for example, and thus shift to the planar operation mode.

Next, another embodiment of the input apparatus will be described.

Figure 17:
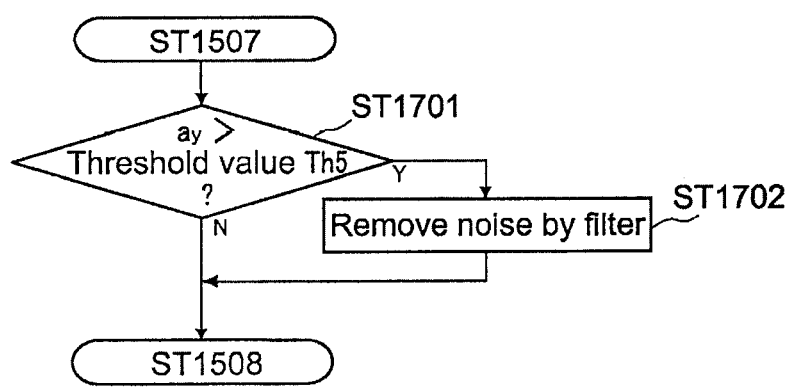
FIG. 17 A flowchart for removing noises caused when the input apparatus is in the planar operation mode.

FIG. 17 is a flowchart for removing noises that are caused when the input apparatus 1 is in the planar operation mode.

This embodiment is the same as the embodiment shown in FIG. 15 except that Steps 1701 and 1702 for removing noises that are caused in the planar operation mode are added between Steps 1507 and 1508 as shown in FIG. 17. Therefore, different points will mainly be described.

As in the above embodiment, in the planar operation mode, the acceleration ($a_x$, $a_y$, $a_z$) of the input apparatus 1 are obtained, and the acceleration values ($a_x$, $a_y$, $a_z$) are calculated as described above in Step 1507.

Next, it is judged whether the acceleration value $a_y$ is larger than the threshold value Th5 (ST 1701). The acceleration value $a_y$ is a value close to 0 when the input apparatus 1 is moving on a flat plane and is a value exceeding the threshold value Th5 when the input apparatus 1 is passing through an irregularity or a step, for example. The threshold value Th5 is a value close to 0 that can be changed as appropriate according to surface roughness, for example.

Figure 18:
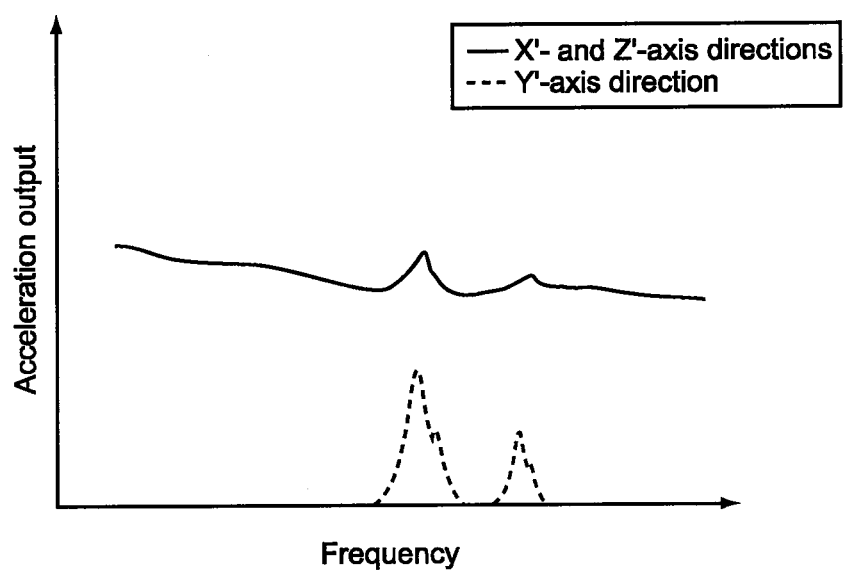
FIG. 18 A diagram showing a relationship between a frequency and output value of an acceleration signal detected by an acceleration sensor.

FIG. 18 is a diagram showing a relationship between a frequency and output value of an acceleration signal detected by the acceleration sensor unit 16. FIG. 18 shows a measurement example in a case where a frequency analysis such as Fourier transform is performed on the acceleration signal detected by the acceleration sensor unit 16, and a solid line represents an output of an acceleration in the X'- or Z'-axis direction whereas a broken line represents an output of an acceleration in the Y'-axis direction. As shown in FIG. 18, when the input apparatus 1 passes through a step when moving on the plane, a fluctuation of the output of the acceleration in the Y' direction is larger than a fluctuation of the output of the acceleration regarding the movement direction of the input apparatus 1 (direction parallel to X'Z' plane).

In this regard, in this embodiment, the acceleration values ($a_x$, $a_z$) calculated in Step 1507 are filtered when the acceleration value $a_y$ is larger than the threshold value Th5 (positive judgment in ST 1701), to thus remove fluctuation components (noises) of the acceleration value caused upon passage through the step. A lowpass filter, for example, can be used as the filter.

On the other hand, when the acceleration value $a_y$ is equal to or smaller than the threshold value Th5 (negative judgment in ST 1701), it is judged that the noise is not caused, and the process advances to Step 1508 without removing the noise.

According to this embodiment, there is provided a filter (ST 1702) for removing frequency components detected by the acceleration sensor unit 16 when the input apparatus 1 is moved on an unflat irregularity or a step on the X'Z' plane shown in FIG. 16. Accordingly, frequency components detected by the acceleration sensor unit 16 when the input apparatus 1 passes through, for example, an irregularity or a step on the X'Z' plane shown in FIG. 16 can be removed. Therefore, it is possible to integrate the acceleration values that do not contain noise components so that more-accurate velocity values can be calculated. As a result, the movement of the pointer 2 can be made smooth.

It should be noted that the above description has described the example where the acceleration values $a_x$ and $a_z$ are filtered when the value of the acceleration value $a_y$ as a reference is equal to or smaller than the threshold value Th5. However, the calculated acceleration values $a_x$ and $a_z$ may constantly be filtered regardless of the value of the acceleration value $a_y$.

In addition, the processing example above has described the case where the input apparatus 1 is moved on the operation surface whose surface property changes locally due to an irregularity, a step, and the like on the plane. However, the processing described above may be executed for the purpose of removing noises due to a sliding resistance caused when the input apparatus 1 moves on a plane whose surface property is uniform. The frequency of sliding noises in this case is higher than a shake frequency in many cases (e.g., 15 Hz or more), so a lowpass filter that has the frequency band concerned as a cutoff band can be employed. Furthermore, a judgment may be made on the 3-dimensional operation and the planar operation of the input apparatus 1 with presence/absence of a detection of sliding noises described above as a reference.

Next, another embodiment of the input apparatus will be described.

Figure 19:
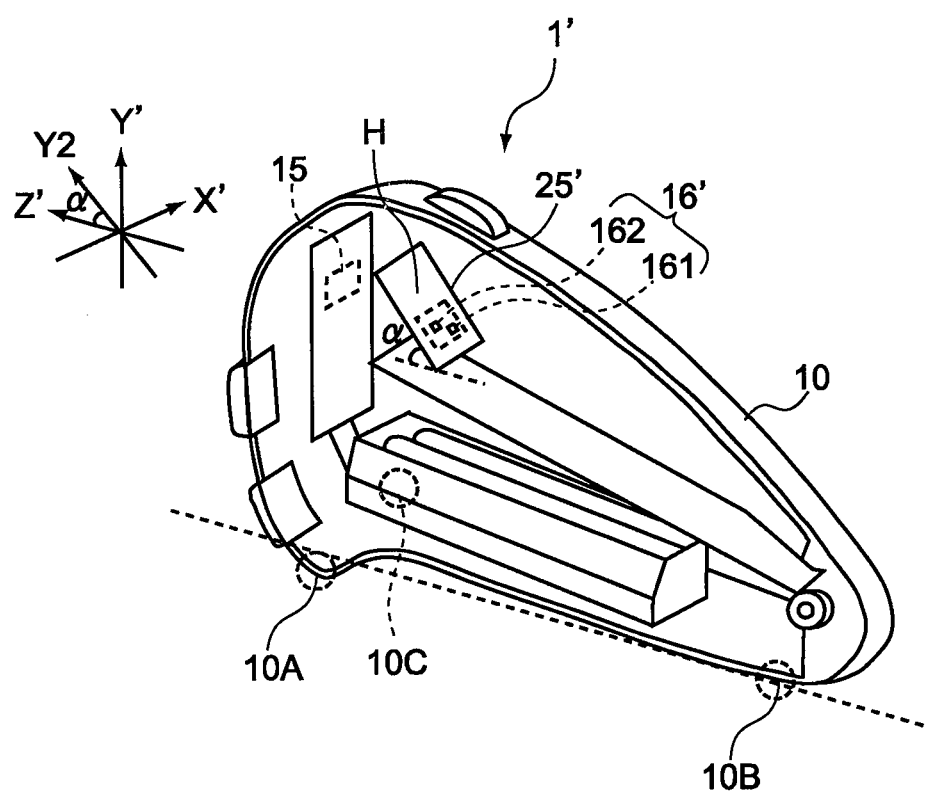
FIG. 19 A diagram showing a state where an input apparatus according to another embodiment is placed on a plane.

FIG. 19 is a cross-sectional diagram showing a state where an input apparatus of another embodiment is placed on a plane.

An input apparatus 1' of this embodiment is different from the input apparatus 1 shown in FIG. 16 in the point of including an acceleration sensor unit 16' mounted on a circuit board 25' in place of the acceleration sensor unit 16. Thus, different points will mainly be described.

As shown in FIG. 19, the acceleration sensor unit 16' includes a first acceleration sensor 161 for detecting an acceleration in the X'-axis direction and a second acceleration sensor 162 for detecting an acceleration in a Y2-axis direction. The Y2 axis is tilted by an angle α (e.g., approximately 45 degrees (45 degrees±1 degree or 45 degrees±2 degrees)) with respect to the Z' axis. An acceleration detection surface H including the X' axis and the Y2 axis is provided while being tilted by the angle α (e.g., 45 degrees) with respect to the X'Z' plane. In other words, the acceleration sensor unit 16' is provided inside the casing 10 such that, when the input apparatus 1' is moved while placed on the X'Z' plane as shown in FIG. 19, the acceleration detection surface H is tilted by the angle α with respect to the X'Z' plane. It should be noted that the tilt angle of the acceleration sensor unit 16' is not limited to 45 degrees and can be changed as appropriate. Whatever degree the tilt angle α is, an acceleration value $a_{y2}$ in the depth direction in the planar operation can be obtained by a calculation that uses a trigonometric function as will be described later.

As described above, the velocity value of the pointer 2 on the screen 3 in the Y-axis direction (longitudinal direction) is obtained based on the velocity value of the input apparatus 1' in the Z'-axis direction (depth direction) in the planar operation mode. The velocity value of the pointer 2 on the screen 3 in the X-axis direction (lateral direction) is obtained based on the velocity value of the input apparatus 1' in the X'-axis direction in the planar operation mode.

Figure 20:
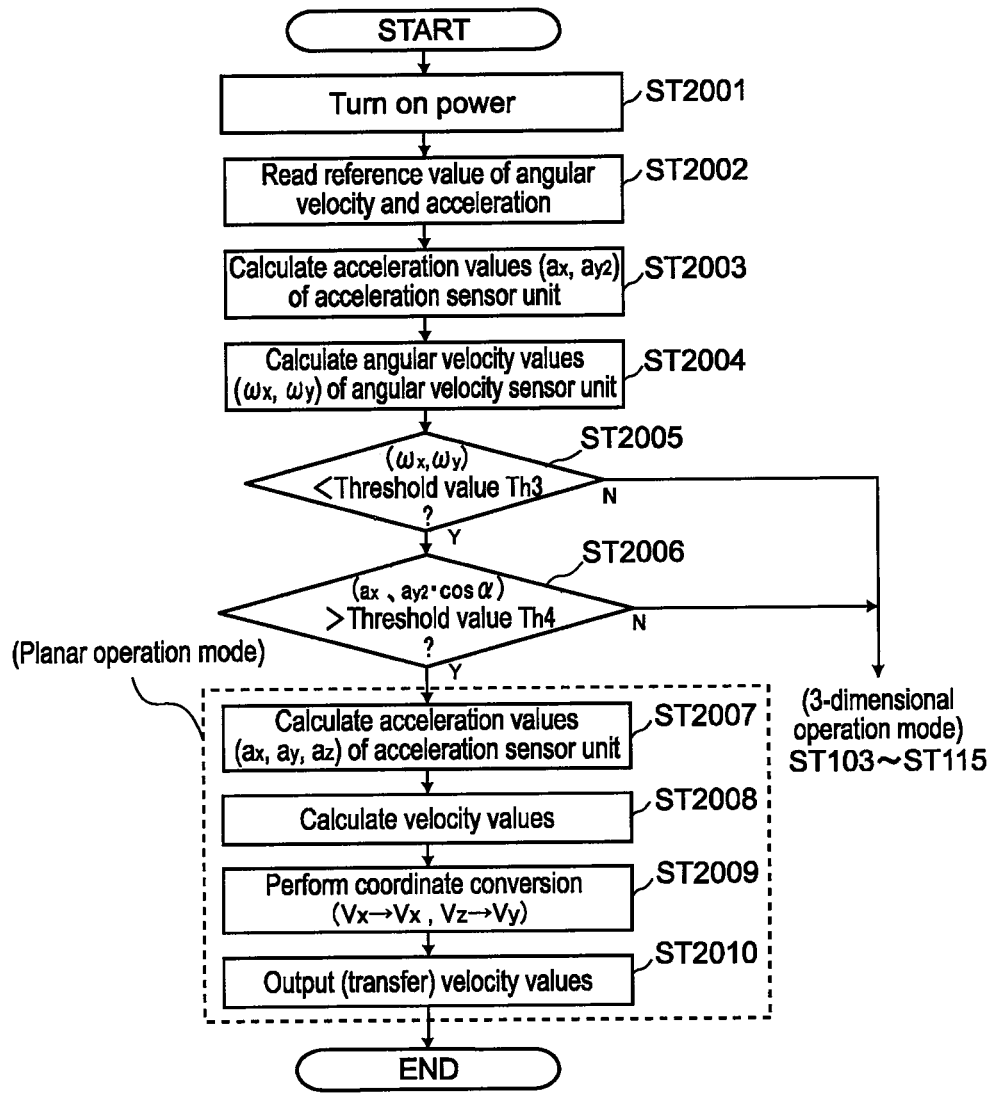
FIG. 20 A flowchart showing a switch operation of the input operation modes (3-dimensional operation mode and planar operation mode) of the input apparatus shown in FIG. 19.
Figure 21:
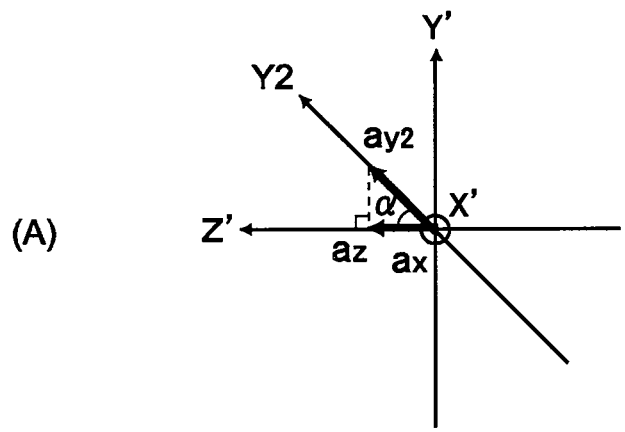
FIG. 21 Diagrams for illustrating components of an acceleration value $a_{y2}$ in a Y' and Z'-axis directions.
Figure 21:
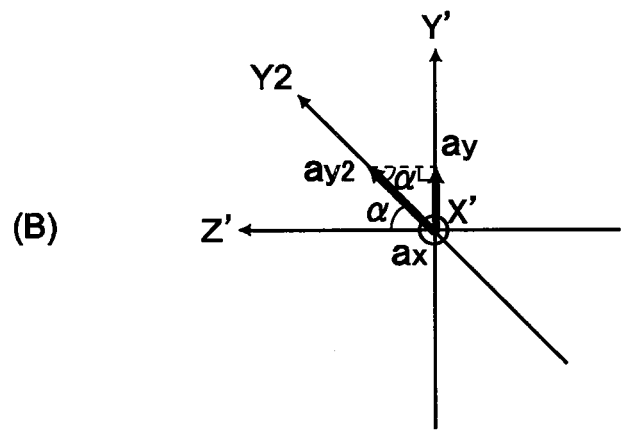

FIG. 20 is a flowchart showing a switch operation of the input operation modes (3-dimensional operation mode and planar operation mode) of the input apparatus 1', and FIG. 21 are diagrams for illustrating components of the acceleration value $a_{y2}$ in the Y' and Z'-axis directions. It should be noted that in this embodiment, Steps 2003, 2006 to 2009, and the like are different as compared to FIG. 15. Thus, different points will mainly be described.

In Step 2003, acceleration signals are obtained from the acceleration sensor unit 16', and acceleration values ($a_x$, $a_z$ (=$a_{y2}$*cos α)) are calculated as shown in FIG. 21A (ST 2003). As shown in FIG. 21A, the acceleration value $a_x$ is an acceleration value in the X'-axis direction, the acceleration value $a_{y2}$ is an acceleration value in the Y2-axis direction, and the acceleration value $a_z$ (=$a_{y2}$*cos α) is an acceleration value in the Z'-axis direction.

In Step 2006, it is judged whether at least one of the acceleration values ($a_x$, $a_z$ (=$a_{y2}$*cos α)) is larger than the threshold value Th4.

When at least one of the acceleration values ($a_x$, $a_z$ (=$a_{y2}$*cos α)) is larger than the threshold value Th4 in Step 2006 (positive judgment in ST 2006), it can be judged that an acceleration movement is made in at least one of the X'- and Z'-axis directions on the plane. Therefore, it is judged that the input apparatus 1' is operated on the X'Z' plane shown in FIG. 19, and the planar operation mode of Step 2007 and subsequent steps is executed.

When both of the acceleration values ($a_x$, $a_z$ (=$a_{y2}$*cos α)) are equal to or smaller than the threshold value Th4 in Step 2006, it is judged that the input apparatus 1' is not moving on the plane, and the 3-dimensional operation mode is executed without shifting to the planar operation mode (ST 103 to ST 115).

(Planar Operation Mode)

When it is judged that the input apparatus 1' is in the planar operation mode by (the positive judgment of) Step 2005 and (the positive judgment of) Step 2006, the acceleration values ($a_x$, $a_{y2}$) of the input apparatus 1' in the planar operation are obtained, and the acceleration values ($a_x$, $a_z$ (=$a_{y2}$*cos α)) are calculated as described above (ST 101a to ST 114 in FIG. 11) in Step 2007.

The velocity values ($V_x$, $V_z$) are calculated by integrating the acceleration values ($a_x$, $a_z$ (=$a_{y2}$*cos α)) as in the above embodiment (ST 2008).

Next, the velocity value $V_x$ of the pointer 2 in the X-axis direction on the screen 3 shown in FIG. 6 is obtained based on the velocity value $V_x$ of the input apparatus 1' in the X' direction on the X'Z' plane shown in FIG. 19, and the velocity value of the pointer 2 in the Y-axis direction on the screen 3 is obtained based on the velocity value $V_z$ of the input apparatus 1' in the Z' direction on the X'Z' plane shown in FIG. 19 (ST 2009).

Accordingly, the movement of the input apparatus 1' in the X' direction on the X'Z' plane of FIG. 19 corresponds to the movement of the pointer 2 in the X direction on the screen 3, and the movement of the input apparatus 1' in the Z' direction on the X'Z' plane of FIG. 19 corresponds to the movement of the pointer 2 in the Y direction on the screen 3.

In the 3-dimensional operation mode, the acceleration value $a_y$ in the Y' direction is calculated by $a_{y2}$*sin α as shown in FIG. 21B, in Step 101a shown in FIG. 11, for example. As shown in FIG. 21B, the acceleration value $a_x$ is an acceleration value in the X'-axis direction, the acceleration value $a_{y2}$ is an acceleration value in the Y2-axis direction, and the acceleration value $a_y$ (=$a_{y2}$*sin α) is an acceleration value in the Y'-axis direction. The velocity value $V_y$ in the Y' direction in space can be obtained by integrating the acceleration value $a_y$ (=$a_{y2}$*sin α). The velocity value $V_y$ of the pointer 2 in the Y direction on the screen 3 is obtained based on the velocity value $V_y$ in the Y' direction in space.

According to this embodiment, the acceleration sensor unit 16' is provided inside the casing 10 such that, when the input apparatus 1' is moved on the X'Z' plane shown in FIG. 19, the acceleration detection surface H is tilted by the angle α (e.g., 45 degrees) with respect to the X'Z' plane shown in FIG. 19. Accordingly, when the input apparatus 1' is moved on the X'Z' plane, for example, the acceleration value $a_{y2}$ detected in the Y2-axis direction as shown in FIG. 21A can be used to calculate the acceleration value $a_z$ in the Z' direction from $a_{y2}$*cos α. The velocity value $V_z$ in the Z' direction can be calculated by integrating the acceleration value $a_z$ in the Z' direction. The velocity value $V_y$ of the pointer 2 in the Y-axis direction (longitudinal direction) on the screen 3 is obtained based on the velocity value $V_z$ in the Z'-axis direction (depth direction) in the planar operation mode (ST 2009). Accordingly, by moving the input apparatus 1' in the Z'-axis direction (depth direction) on the X'Z' plane shown in FIG. 19, the pointer 2 can be moved vertically on the screen 3.

In the 3-dimensional operation mode, the acceleration value $a_{y2}$ detected in the Y2-axis direction as shown in FIG. 21B can be used to calculate the acceleration value $a_y$ in the Y' direction from $a_{y2}*\sin\alpha$. The velocity value $V_y$ in the Y' direction can be calculated by integrating the acceleration value $a_y$ in the Y' direction. The velocity value $V_y$ of the pointer 2 in the Y direction on the screen 3 is obtained based on the velocity value $V_y$ in the Y' direction in space. Accordingly, by moving the input apparatus 1' in the Y'-axis direction in space shown in FIG. 19, the pointer 2 can be moved vertically on the screen 3.

It is also possible to obtain the velocity value of the pointer 2 in the Y-axis direction on the screen 3 based on a velocity component in the Z'-axis direction of the velocity value in the Y2-axis direction calculated from the acceleration value $a_{y2}$ in the Y2-axis direction in FIG. 19. In this case, since the velocity component in the Z'-axis direction becomes smaller than the velocity value in the Y2-axis direction, a gain only needs to be increased so that the velocity component in the Z'-axis direction increases, for example. Accordingly, the operation in the Y-axis direction on the screen 3 can be carried out smoothly.

Next, another embodiment of the input apparatus will be described.

Figure 22:
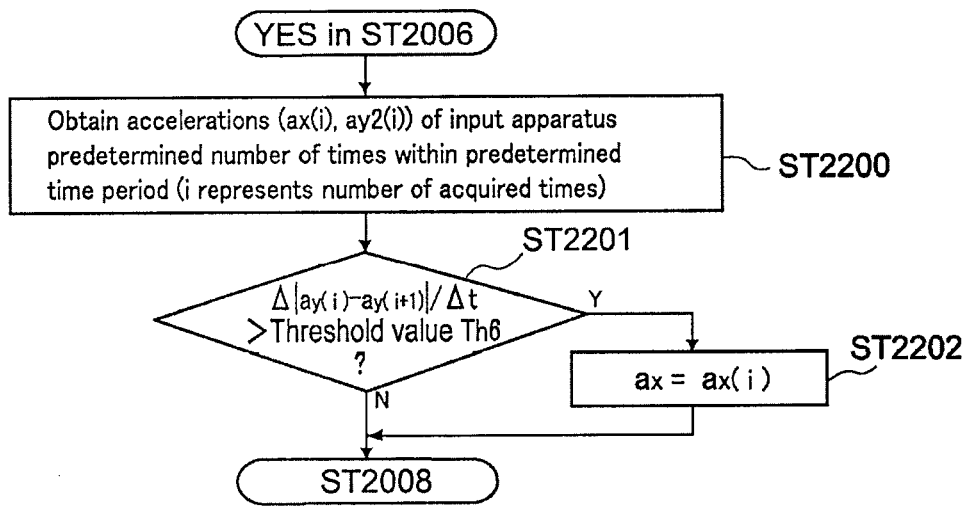
FIG. 22 A flowchart for removing noises caused when the input apparatus is in the planar operation mode.
Figure 23:
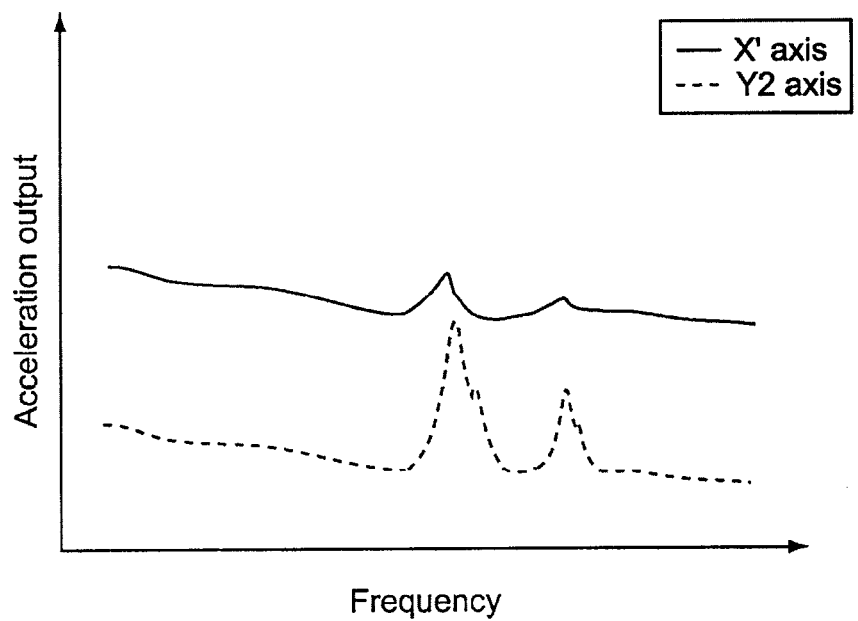
FIG. 23 A diagram showing a relationship between a frequency and output value of an acceleration signal detected by the acceleration sensor unit.

FIG. 22 is a flowchart for removing noises caused when the input apparatus 1' is in the planar operation mode, and FIG. 23 is a diagram showing a relationship between a frequency and output value of an acceleration signal detected by the acceleration sensor unit 16'. FIG. 23 shows a result of carrying out a frequency analysis such as Fourier transform on the acceleration signal detected by the acceleration sensor unit 16'.

This embodiment is the same as the embodiment shown in FIG. 20 except that Step 2200 is provided in place of Step 2007 and ST 2201 and ST 2202 for removing noises caused during the planar operation mode are added between ST 2200 and ST 2008 as shown in FIG. 22. Thus, different points will mainly be described.

As in the above embodiment, in the planar operation mode, accelerations $(a_x(i), a_{y2}(i))$ of the input apparatus 1' are obtained a predetermined number of times within a predetermined time period (i represents the number of acquired times), and accelerations values $(a_x(i), a_{y2}(i))$ are calculated as described above in Step 2200.

Next, it is judged whether a change rate of the acceleration value $\Delta|a_{y2}(i)-a_{y2}(i+1)|/\Delta t$ at an interval of a predetermined time period $\Delta t$ is larger than a threshold value Th6, for example (ST 2201). The change rate $\Delta|a_{y2}(i)-a_{y2}(i+1)|/\Delta t$ is equal to or smaller than the threshold value Th6 when the input apparatus 1' is moving on a flat plane and exceeds the threshold value Th6 when the input apparatus 1' passes through an irregularity, a step, or the like on the plane, for example. When the input apparatus 1' passes through an irregularity, a step, or the like on the plane, for example, noise components are similarly added in the X' direction and the Y2 direction as shown in FIG. 23.

When the change rate $\Delta|a_{y2}(i)-a_{y2}(i+1)|/\Delta t$ is larger than the threshold value Th6 (positive judgment in ST 2201), the noises are removed by the filter (ST 2202). For example, noise components are removed from the acceleration value $a_x$ in the X' direction. With the acceleration value $a_x$ as $a_x(i)$, for example, the velocity value is prevented from being calculated based on a large acceleration value $a_x(i+1)$ that contains noise components in Step 2008, and the velocity value is thus calculated based on a small acceleration value $a_x(i)$ that does not contain noise components.

When the change rate $\Delta|a_{y2}(i)-a_{y2}(i+1)|/\Delta t$ is equal to or smaller than the threshold value Th6 (negative judgment in ST 2201), it is judged that the noise is not caused, and the process advances to Step 2008.

According to this embodiment, it is judged whether the change rate of the acceleration value $\Delta|a_{y2}(i)-a_{y2}(i+1)|/\Delta t$ within a predetermined time period exceeds the threshold value Th6 (ST 2201). By setting the acceleration value $a_x$ as $a_x(i)$ when the change rate exceeds the threshold value Th6, the velocity value is calculated based on $a_x(i)$ that does not contain noise components in Step 2008. Accordingly, it is possible to prevent the velocity value from being calculated based on the large acceleration value $a_x(i+1)$ that contains noise components (attenuation of velocity values). Therefore, in a case where a drastic change occurs in the change rate of the acceleration value $\Delta|a_{y2}(i)-a_{y2}(i+1)|/\Delta t$ within the predetermined time period while the change rate is sampled 10 times, for example, it is possible to reduce a load of the MPU 19 and correct the velocity value to an appropriate value in real time.

Instead of judging whether the change rate of the acceleration value $\Delta|a_{y2}(i)-a_{y2}(i+1)|/\Delta t$ within the predetermined time period exceeds the threshold value Th6 (ST 2201), it is also possible to judge whether $|a_{y2}(i)-a_{y2}(i+1)|$ exceeds a threshold value.

Figure 24:
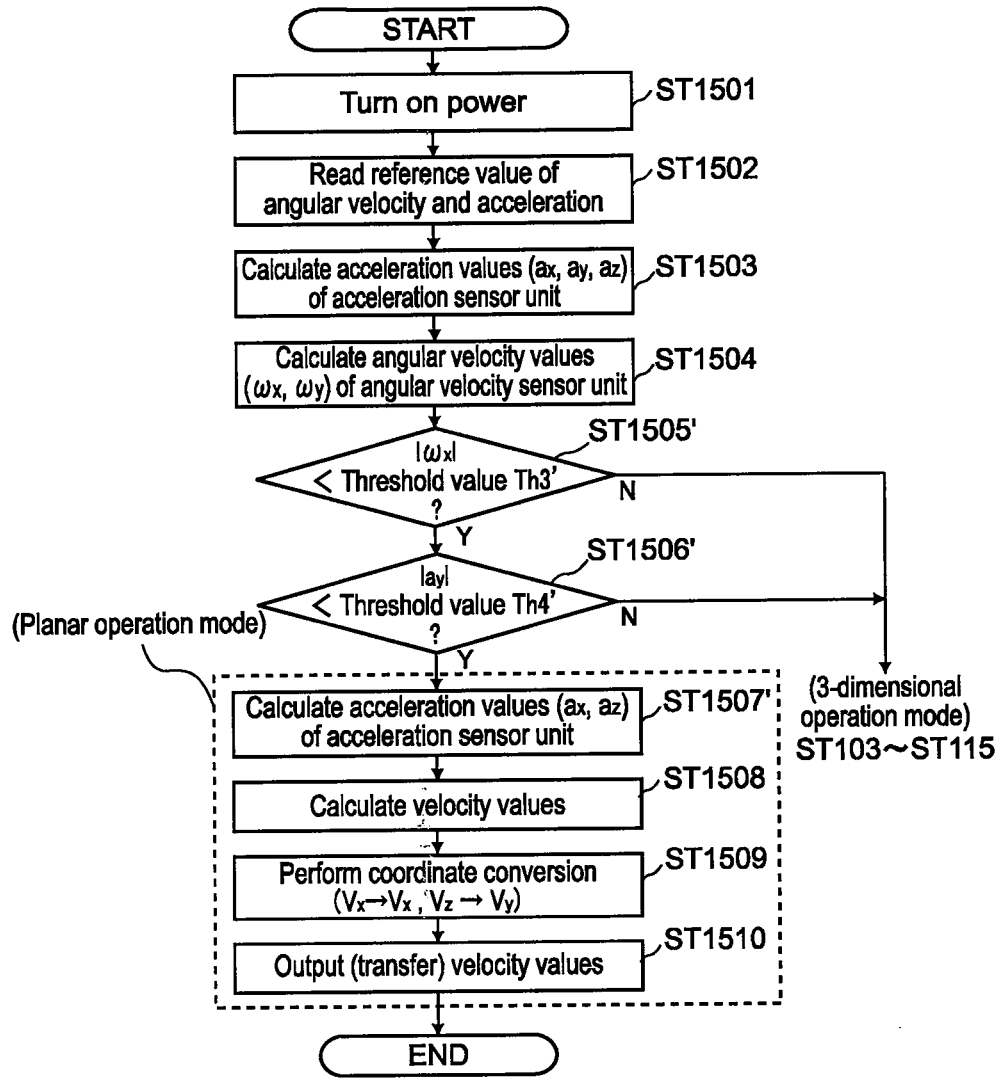
FIG. 24 A flowchart for illustrating a switch operation of the input operation modes of the input apparatus according to another embodiment.

FIG. 24 is a flowchart showing a switch operation of the input operation modes (3-dimensional operation mode and planar operation mode) of the input apparatus 1 according to another embodiment of the present invention. In FIG. 24, the same steps as those of the flowchart shown in FIG. 15 are denoted by the same reference numerals, and detailed descriptions thereof will be omitted.

This embodiment is different from the embodiment shown in FIG. 15 in that a magnitude of the angular velocity value $\omega_x$ and a magnitude of the acceleration value $a_y$ are used as a reference in judging whether the input apparatus 1 is operated on the plane or in space (Steps 1505' and 1506'). The angular velocity value $\omega_x$ is an angular velocity value of the casing 10 about the X' axis calculated in Step 1504, and the acceleration value $a_y$ is an acceleration value of the casing 10 in the Y'-axis direction calculated in Step 1503.

When an absolute value of the angular velocity value $\omega_x$ is equal to or larger than a threshold value Th3' in Step 1505', it is judged that the input apparatus 1 is operated 3-dimensionally, and the 3-dimensional operation mode shown in FIG. 11 (ST 103 to ST 115) is executed. In contrast, when the absolute value of the angular velocity value $\omega_x$ is smaller than the threshold value Th3', the process shifts to Step 1506'.

On the other hand, when an absolute value of the acceleration value $a_y$ is equal to or larger than a threshold value Th4' in Step 1506', it is judged that the input apparatus 1 is operated 3-dimensionally, and the 3-dimensional operation mode shown in FIG. 11 (ST 103 to ST 115) is executed. In contrast, when the absolute value of the acceleration value $a_y$ is smaller than the threshold value Th4', it is judged that the input apparatus 1 is operated on the plane, and the planar operation mode of Step 1507' and subsequent steps is executed.

The angular velocity value $\omega_x$ is basically 0 when the input apparatus 1 is operated on the plane. The angular velocity value $\omega_y$ does not become 0 as long as the operation of the input apparatus 1 on the plane is accompanied by a rotational movement about the Y' axis. Similarly, because the acceleration value $a_y$ is basically 0 when the input apparatus 1 is operated on the plane, it is only necessary that the magnitude of the acceleration value $a_y$ be referenced when judging whether the input apparatus 1 is operated on the plane or in space. Therefore, according to this embodiment, it is possible to more-easily and more-accurately judge an operation mode of whether the input apparatus 1 is operated on the plane or in space with.

It should be noted that the values of the threshold values Th3' and Th4' are not particularly limited and can be set to appropriate values. Moreover, also in this example, it is possible that, when the same judgment result is consecutively obtained for over a predetermined time period in the judgment on whether the input apparatus 1 is operated 3-dimensionally, a switch be made to the operation mode that corresponds to the judgment result.

In this embodiment, the acceleration value that is referenced in executing the planar operation mode is the acceleration value $a_x$ in the X'-axis direction and the acceleration value $a_z$ in the Z'-axis direction (Step 1507'). This is because it is possible to control the movement of the pointer 2 even without referencing the acceleration value $a_y$ in the Y'-axis direction when the input apparatus 1 is operated on the plane.

Figure 25:
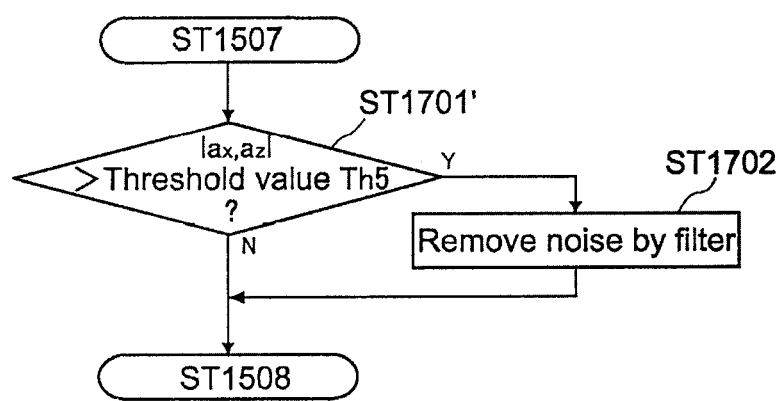
FIG. 25 A flowchart for illustrating a detail of a main portion of the flowchart shown in FIG. 24.

Further, in this embodiment, by executing the flow shown in FIG. 25 in the planar operation of the input apparatus 1, noise components that may be caused when the input apparatus 1 is moved on the plane can be removed. Specifically, though the value of the acceleration $a_y$ of the input apparatus 1 in the Y' direction has been used as a reference in the processing example shown in FIG. 17, this embodiment is different therefrom in that a magnitude (absolute value) of the acceleration in the X' direction and the acceleration in the Z' direction is used as a reference (Step 1701'). A smooth movement of the pointer 2 can also be realized by executing such processing.

Figure 26:
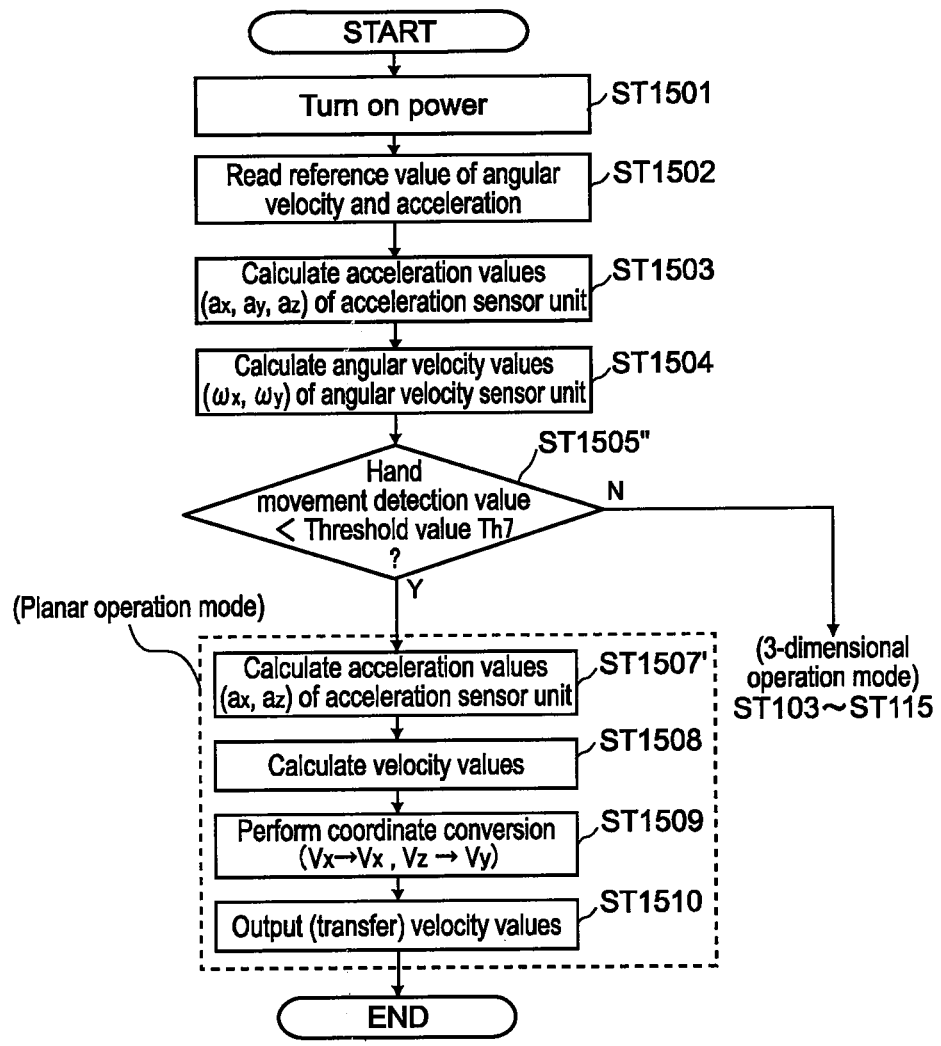
FIG. 26 A flowchart for illustrating a switch operation of the input operation modes of the input apparatus according to another embodiment.

FIG. 26 is a flowchart showing a switch operation of the input operation modes (3-dimensional operation mode and planar operation mode) of the input apparatus 1 according to another embodiment of the present invention. In FIG. 26, steps corresponding to those of the flowcharts of FIGS. 15 and 24 are denoted by the same reference numerals, and detailed descriptions thereof will be omitted.

This embodiment is different from the embodiments shown in FIGS. 15 and 24 in that a hand movement detection value of the input apparatus 1 is referenced in judging whether the input apparatus 1 is operated on the plane or in space (Step 1505").

When the input apparatus 1 is operated 3-dimensionally, the sensor unit 17 detects hand movement components that act on the casing 10 as well as the 3-dimensional operation of the casing 10. On the other hand, when the input apparatus 1 is operated on the plane, a hand movement does not normally act on the casing 10, with the result that a movement corresponding to the hand movement component is not detected. In this regard, in this embodiment, by judging presence/absence of the hand movement component based on the detection value of the sensor unit 17, or judging whether the hand movement component is a predetermined level or less, a judgment is made on the planar operation and the 3-dimensional operation of the input apparatus 1.

A level of hand movements can be detected by referencing a change in the angular velocity values ($\omega_y$, $\omega_y$) detected by the angular velocity sensor unit 15 or a change in the acceleration values ($a_x$, $a_y$). An operation frequency of the casing 10 when operated 3-dimensionally is, for example, 0.03 to 10 Hz, and a shake frequency is equal to or larger than that frequency (e.g., 10 to 20 Hz). Therefore, by frequency-analyzing the detection signal of the sensor unit 17, presence/absence of hand movement components can be detected. A method other than that described above may be used for the detection of a hand movement.

When the hand movement detection value is equal to or larger than a threshold value Th7 in Step 1505", it is judged that the input apparatus 1 is operated 3-dimensionally, and the 3-dimensional operation mode shown in FIG. 11 (ST 103 to ST 115) is executed. In contrast, when the hand movement detection value is smaller than the threshold value Th7, it is judged that the input apparatus 1 is operated on the plane, and the planar operation mode of Step 1507' and subsequent steps is executed.

As described above, also in this embodiment, it is possible to more-easily and more-accurately judge an operation mode of whether the input apparatus 1 is operated on the plane or in space. It should be noted that as a reference for the judgment on the operation mode of the input apparatus 1, in addition to the hand movement detection value described above, a magnitude of sliding noises that may be detected during the planar operation of the input apparatus 1 may be used. Moreover, also in this example, it is possible that, when the same judgment result is obtained consecutively for over a predetermined time period in the judgment on whether the input apparatus 1 is operated 3-dimensionally, a switch be made to the operation mode that corresponds to the judgment result.

Figure 27:
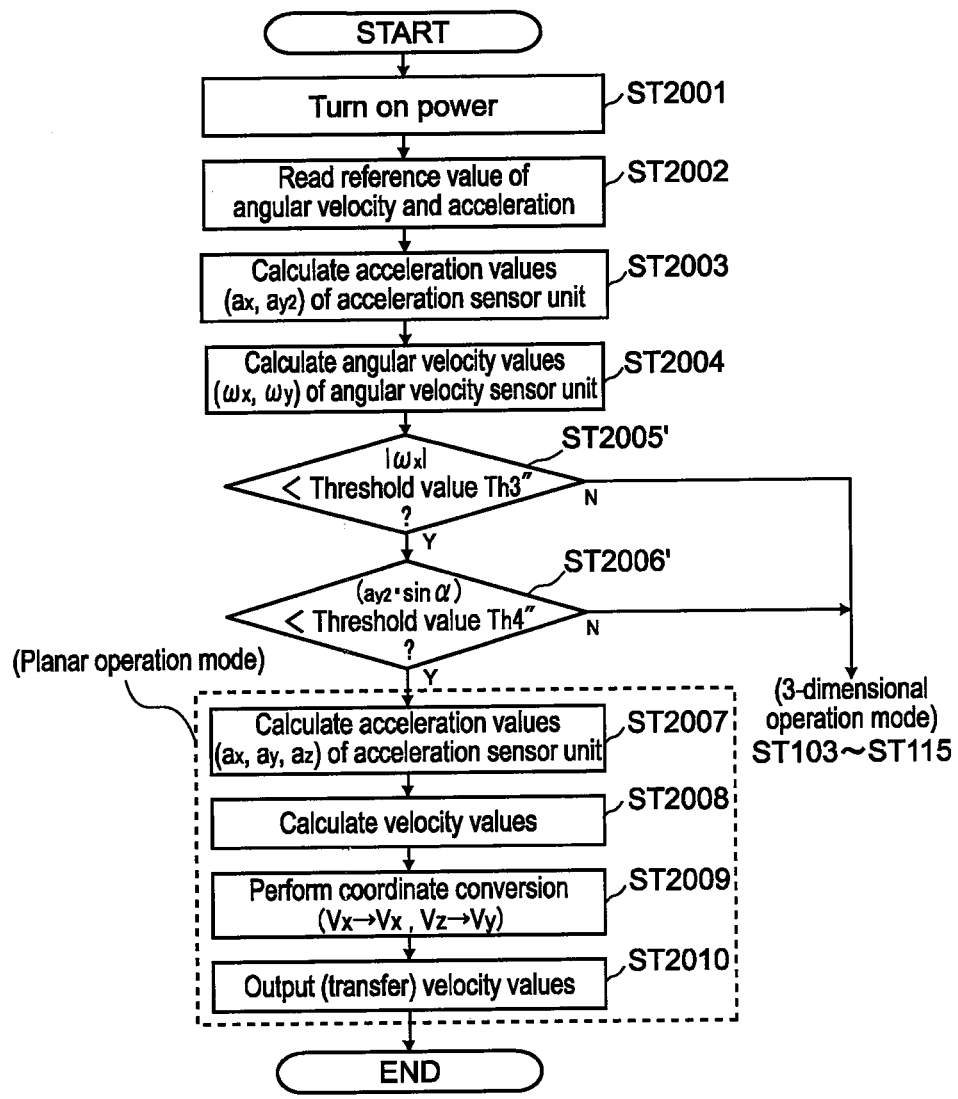
FIG. 27 A flowchart for illustrating a switch operation of the input operation modes of the input apparatus according to another embodiment.

FIG. 27 is a flowchart showing a switch operation of the input operation modes (3-dimensional operation mode and planar operation mode) of the input apparatus 1 according to another embodiment. In FIG. 27, steps that are the same as those of the flowchart shown in FIG. 20 are denoted by the same reference numerals, and detailed descriptions thereof will be omitted.

This embodiment is different from the embodiment shown in FIG. 20 in that a magnitude of the angular velocity value $\omega_x$ and a magnitude of the acceleration value $a_{y2}*\sin\alpha$ are used as a reference in judging whether the input apparatus 1 is operated on the plane or in space (Steps 2005' and 2006'). The angular velocity value $\omega_x$ is an angular velocity value of the casing 10 about the X' axis calculated in Step 2004, and the acceleration value $a_{y2}$ is an acceleration value of the casing 10 in the Y'-axis direction calculated in Step 2003.

When an absolute value of the angular velocity value $\omega_x$ is equal to or larger than a threshold value Th3" in Step 2005', it is judged that the input apparatus 1 is operated 3-dimensionally, and the 3-dimensional operation mode shown in FIG. 11 (ST 103 to ST 115) is executed. In contrast, when the absolute value of the angular velocity value $\omega_x$ is smaller than the threshold value Th3", the process shifts to Step 2006'.

On the other hand, when an absolute value of the acceleration value $a_{y2}*\sin\alpha$ is equal to or larger than a threshold value Th4" in Step 2006', it is judged that the input apparatus 1 is operated 3-dimensionally, and the 3-dimensional operation mode shown in FIG. 11 (ST 103 to ST 115) is executed. In contrast, when the absolute value of the acceleration value $a_{y2}*\sin\alpha$ is smaller than the threshold value Th4", it is judged that the input apparatus 1 is operated on the plane, and the planar operation mode of Step 2007 and subsequent steps is executed.

The angular velocity value $\omega_x$ is basically 0 when the input apparatus 1 is operated on the plane. The angular velocity value $\omega_y$ does not become 0 as long as the operation of the input apparatus 1 on the plane is accompanied by a rotational movement about the Y' axis. Similarly, because the acceleration value $a_{y2}*\sin\alpha$ is basically 0 when the input apparatus 1 is operated on the plane, it is only necessary that the magnitude of the acceleration value $a_{y2}*\sin\alpha$ be referenced when judging whether the input apparatus 1 is operated on the plane or in space. Therefore, according to this embodiment, it is possible to more-easily and more-accurately judge an operation mode of whether the input apparatus 1 is operated on the plane or in space.

In the above embodiments, as shown in FIG. 15, the input apparatus 1 side calculates the acceleration values and velocity values of the input apparatus 1 in Steps 1507 and 1508 and calculates the velocity value $V_y$ of the pointer 2 in the Y-axis direction on the screen 3 shown in FIG. 6 based on the velocity value $V_z$ of the input apparatus 1 in the Z' direction on the X'Z' plane of FIG. 16 in Step 1509. However, those processes may be carried out on the control apparatus 40 side. Accordingly, an operational load of the input apparatus 1 can be reduced.

The above embodiments have shown the example where the velocity values ($V_x$, $V_y$) are output to the control apparatus 40 after being subjected to coordinate conversion as shown in Step 1509 of FIG. 15. However, it is also possible that the velocity values ($V_x$, $V_z$) be output to the control apparatus 40 without carrying out Step 1509 after Step 1508 in FIG. 15, and the control apparatus 40 side carry out the coordinate conversion shown in Step 1509.

The above embodiments have shown the example where a switch is made between the planar operation mode and the 3-dimensional operation mode in accordance with whether the angular velocity values ($\omega_x$, $\omega_y$) are smaller than the threshold value Th3 (ST 1505) and whether at least one of the acceleration values ($a_x$, $a_z$) is larger than the threshold value Th4 (ST 1506) as shown in FIG. 15. However, it is also possible for the mode to be shifted to the planar operation mode when the acceleration value $a_y$ in the Y' direction vertical to the X'Z' plane shown in FIG. 16 is equal to or smaller than a threshold value and at least one of the acceleration value $a_x$ in the X' direction and the acceleration value $a_z$ in the Z' direction is equal to or larger than the threshold value Th4, for example.

The above embodiments have shown the example where it is judged that the input apparatus 1 is operated on the plane when the angular velocity values ($\omega_x$, $\omega_y$) are smaller than the threshold value Th3 in Step 1505 (positive judgment in ST 1505) and at least one of the acceleration values ($a_x$, $a_z$) is larger than the threshold value Th4 as shown in FIG. 15. However, it is also possible to judge that the input apparatus 1 is operated on the plane when either one of the angular velocity values ($\omega_x$, $\omega_y$) is smaller than the threshold value Th3 in Step 1505 and at least one of the acceleration values ($a_x$, $a_z$) is larger than the threshold value Th4.

The above embodiments have shown the example where the input apparatus 1 includes the angular velocity sensors 151 and 152 as shown in FIG. 16. In this case, however, the angular velocity about the Z' axis cannot be detected. At this time, a change amount of the first acceleration sensor 161 and second acceleration sensor 162 may be calculated and subjected to a predetermined operational processing so that the obtained value can be used as the angular velocity value about the Z' axis. For example, a judgment condition of whether the angular velocity value about the Z' axis is smaller than a threshold value may be added to the judgment condition for performing the switch to the planar operation mode.

The above embodiments have shown the example where the bottom portions 10A, 10B, and 10C of the casing 10 of the input apparatus 1 are in contact with the X'Z' plane as shown in FIG. 16. However, for enhancing a degree of freedom in design of the input apparatus 1, a shape of the casing 10 of the input apparatus 1 may be changed so that two points of the input apparatus 1 come into contact with the X'Z' plane, for example. The mode switch described above can also be applied to this case.

At this time, for example, although the rotation about the Z' axis is facilitated, because the gravitational effect on the acceleration sensor unit 16 is suppressed by separating the acceleration value in the X'-axis direction and the gravity component in the X'-axis direction (see FIG. 9B) as shown in Steps 101a to 114 in FIG. 11, the switch between the planar operation mode and the 3-dimensional operation mode can be executed accurately.

In the above embodiments, the velocity values have been calculated based on the acceleration values detected by the acceleration sensor unit 16 after the shift to the planar operation system as shown in Step 1507 of FIG. 15. However, it is also possible for the acceleration values to be subjected to a correction operation based on the angular velocity values detected by the angular velocity sensor unit 15 after the shift to the planar operation system.

The input apparatuses according to the above embodiments have transmitted input information to the control apparatus wirelessly. However, the input information may be transmitted by wire.

The present invention may be applied to, for example, a handheld-type information processing apparatus (handheld apparatus) including a display section. In this case, by the user moving a main body of the handheld apparatus, a pointer displayed on the display section is moved. Examples of the handheld apparatus include a PDA (Personal Digital Assistance), a cellular phone, a portable music player, and a digital camera.

In the above embodiments, the pointer 2 that moves on the screen in accordance with the movement of the input apparatus 1 has been represented as an image of an arrow. However, the image of the pointer 2 is not limited to the arrow and may be a simple circle, square, or the like, or a character image or any other images.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

As the method of calculating the velocity values ($V_x$, $V_y$) (plane velocity values and spatial velocity values), the above embodiments have employed a method in which the MPU 19 calculates the velocity values by integrating the acceleration values ($a_x$, $a_y$) while using the angular velocity values ($\omega_x$, $\omega_y$) as an adjunct for the integration operation, though not limited thereto. For example, the acceleration values ($a_x$, $a_y$) may be divided by angular acceleration values ($\Delta\omega_x$, $\Delta\omega_y$) to thus obtain radius gyrations ($R_x$, $R_y$) of the movement of the input apparatus 1. In this case, the velocity values ($V_x$, $V_y$) can be calculated by multiplying the radius gyrations ($R_x$, $R_y$) by the angular velocity values ($\omega_y$, $\omega_y$). The radius gyrations ($R_x$, $R_y$) may also be obtained by dividing the acceleration change rates ($\Delta a_x$, $\Delta a_y$) by angular acceleration change rates ($\Delta(\Delta\omega_x)$, $\Delta(\Delta\omega_y)$). By calculating the velocity values by the calculation method above, an operational feeling of the input apparatus 1 that matches the intuition of the user can be obtained, and moreover, the movement of the pointer 2 on the screen 3 accurately matches the movement of the input apparatus 1. Furthermore, as the method of calculating the velocity values $(V_x, V_y)$, the detected angular velocity values $(\omega_x, \omega_y)$ may be used as they are as the velocity values $(V_x, V_y)$ of the casing. It is also possible to obtain the angular acceleration values $(\Delta\omega_x, \Delta\omega_y)$ by temporally differentiating the detected angular velocity values $(\omega_x, \omega_y)$ and use them as the acceleration values of the casing.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An input apparatus for controlling a movement of a pointer on a screen, the input apparatus comprising:
   a casing;
   an inertia sensor to detect a movement of the casing, the inertia sensor including an acceleration sensor to detect an acceleration of the casing and an angular velocity sensor to detect an angular velocity of the casing;
   a plane-corresponding value calculation means for calculating, based on a detection value of the inertia sensor, a plane-corresponding value that corresponds to the movement of the casing on a plane, the plane-corresponding value corresponding to a displacement amount of the pointer on the screen;
   a space-corresponding value calculation means for calculating, based on the detection value of the inertia sensor, a space-corresponding value that corresponds to the movement of the casing in space, the space-corresponding value corresponding to the displacement amount of the pointer on the screen;
   a judgment means for judging whether the movement of the casing is on a plane or in space; and
   a switch means for making a switch between, based on the judgment by the judgment means, the calculation of the plane-corresponding value and the calculation of the space-corresponding value, wherein the switch mean switches from the calculation of the plane-corresponding value to the calculation of the space-corresponding value based on at least one angular velocity value obtained from the angular velocity sensor being larger than a first threshold value,
   wherein the angular velocity sensor obtains a first angular velocity value corresponding to a first direction, and a second angular velocity value corresponding to a second direction;
   wherein the acceleration sensor obtains a first acceleration value corresponding to a third direction, and a second acceleration value corresponding to the second direction, and
   wherein the switch mean switches from the calculation of the plane-corresponding value to the calculation of the space-corresponding value when the first angular velocity value and the second angular velocity value are less than the first threshold value, and the first acceleration value and the second acceleration value are less than a second threshold value.

2. The input apparatus according to claim 1, wherein the judgment means judges whether the movement of the casing is on the plane or in space based on a hand movement detection value of the inertia sensor.

3. The input apparatus according to claim 1, wherein the judgment means judges whether the movement of the casing is on the plane or in space based on whether a movement detection value of the casing detected by the inertia sensor in a direction orthogonal to the plane is equal to or smaller than a predetermined value.

4. The input apparatus according to claim 2, wherein the switch means makes the switch between the calculation of the plane-corresponding value by the plane-corresponding value calculation means and the calculation of the space-corresponding value by the space-corresponding value calculation means, when the judgment means consecutively makes the same judgment for over a predetermined time period.

5. The input apparatus according to claim 3, wherein the switch means makes the switch between the calculation of the plane-corresponding value by the plane-corresponding value calculation means and the calculation of the space-corresponding value by the space-corresponding value calculation means, when the judgment means consecutively makes the same judgment for over a predetermined time period.

6. The input apparatus according to claim 1, further comprising:
   a first inertia sensor to detect the movement of the casing in a direction along a first axis;
   a second inertia sensor to detect the movement of the casing in a direction along a second axis orthogonal to the first axis; and
   a third inertia sensor to detect the movement of the casing in a direction along a third axis orthogonal to the first axis and the second axis,
   wherein the space-corresponding value calculation means calculates a corresponding value that corresponds to the displacement amount of the pointer in a first direction on the screen based on a detection value of the first inertia sensor, and calculates a corresponding value that corresponds to the displacement amount of the pointer in a second direction on the screen based on a detection value of the second inertia sensor, and
   wherein the plane-corresponding value calculation means calculates a corresponding value that corresponds to the displacement amount of the pointer in the first direction on the screen based on the detection value of the first inertia sensor, and calculates a corresponding value that corresponds to the displacement amount of the pointer in the second direction on the screen based on a detection value of the third inertia sensor.

7. The input apparatus according to claim 1, wherein the inertia sensor includes an acceleration sensor and an angular velocity sensor.

8. The input apparatus according to claim 1, further comprising
   a filter to remove from the detection value of the inertia sensor a vibration frequency component generated by the movement of the casing on the plane.

9. The input apparatus according to claim 8, wherein the judgment means additionally judges whether the acceleration value detected by the acceleration sensor is larger than the second threshold value, and
   wherein the switch means makes the switch between the calculation of the plane-corresponding value by the plane-corresponding value calculation means and the calculation of the space-corresponding value by the space-corresponding value calculation means based on whether the acceleration value is larger than the second threshold value when the angular velocity value is smaller than the first threshold value.

10. A control apparatus controlling display of a pointer displayed on a screen based on a detection value of an inertia sensor output from an input apparatus including a casing and the inertia sensor to detect a movement of the casing, the control apparatus comprising:
 a reception means for receiving the detection value of the inertia sensor output from the input apparatus;
 a plane-corresponding value calculation means for calculating, based on the detection value of the inertia sensor received by the reception means, a plane-corresponding value that corresponds to the movement of the casing on a plane, the plane-corresponding value corresponding to a displacement amount of the pointer on the screen;
 a space-corresponding value calculation means for calculating, based on the detection value of the inertia sensor received by the reception means, a space-corresponding value that corresponds to the movement of the casing in space, the space-corresponding value corresponding to the displacement amount of the pointer on the screen;
 a judgment means for judging whether the movement of the casing is on the plane or in space; and
 a coordinate information generation means for generating coordinate information of the pointer on the screen that corresponds to information on the plane-corresponding value or the space-corresponding value, wherein the coordinate information corresponds to the space-corresponding value based on at least one angular velocity value obtained from the inertia sensor being larger than a first threshold value,
 wherein the inertia sensor obtains a first angular velocity value corresponding to a first direction, and a second angular velocity value corresponding to a second direction;
 wherein the inertia sensor obtains a first acceleration value corresponding to a third direction, and a second acceleration value corresponding to the second direction;
 wherein the wherein the coordinate information corresponds to the space-corresponding value when the first angular velocity value and the second angular velocity value are less than the first threshold value, and the first acceleration value and the second acceleration value are less than a second threshold value.

11. A control system comprising:
 an input apparatus to output information on a detection value; and
 a control apparatus to control a movement of a pointer displayed on a screen based on the information on the detection value output from the input apparatus,
 the input apparatus including
  a casing,
  an inertia sensor to detect a movement of the casing, the inertia sensor including an acceleration sensor to detect an acceleration of the casing and an angular velocity sensor to detect an angular velocity of the casing,
  a plane-corresponding value calculation means for calculating, based on a detection value of the inertia sensor, a plane-corresponding value that corresponds to the movement of the casing on a plane, the plane-corresponding value corresponding to a displacement amount of the pointer on the screen, and
  a space-corresponding value calculation means for calculating, based on the detection value of the inertia sensor, a space-corresponding value that corresponds to the movement of the casing in space, the space-corresponding value corresponding to the displacement amount of the pointer on the screen,
 the control apparatus including
  a reception means for receiving information on the plane-corresponding value or the space-corresponding value, and
  a coordinate information generation means for generating coordinate information of the pointer on the screen that corresponds to the information on the plane-corresponding value or the space-corresponding value, and
 wherein the coordinate information corresponds to the space-corresponding value based on at least one angular velocity value obtained from the angular velocity sensor being larger than a first threshold value,
 wherein the angular velocity sensor obtains a first angular velocity value corresponding to a first direction, and a second angular velocity value corresponding to a second direction;
 wherein the acceleration sensor obtains a first acceleration value corresponding to a third direction, and a second acceleration value corresponding to the second direction, and
 wherein the coordinate information corresponds to the space-corresponding value when the first angular velocity value and the second angular velocity value are less than the first threshold value, and the first acceleration value and the second acceleration value are less than a second threshold value.

12. A control system comprising:
 an input apparatus to output information on a detection value; and
 a control apparatus to control a movement of a pointer displayed on a screen based on the information on the detection value output from the input apparatus,
 the input apparatus including
  a casing,
  an inertia sensor to detect a movement of the casing, the inertia sensor including an acceleration sensor to detect an acceleration of the casing and an angular velocity sensor to detect an angular velocity of the casing, and
  an output means for outputting a detection value of the inertia sensor,
 the control apparatus including
  a reception means for receiving information on the detection value of the inertia sensor output by the output means,
  a plane-corresponding value calculation means for calculating, based on the detection value of the inertia sensor received by the reception means, a plane-corresponding value that corresponds to the movement of the casing on a plane, the plane-corresponding value corresponding to a displacement amount of the pointer on the screen,
  a space-corresponding value calculation means for calculating, based on the detection value of the inertia sensor received by the reception means, a space-corresponding value that corresponds to the movement of the casing in space, the space-corresponding value corresponding to the displacement amount of the pointer on the screen, and a coordinate information generation means for generating coordinate information of the pointer on the screen that corresponds to information on the plane-corresponding value or the space-corresponding value,
wherein the coordinate information corresponds to the space-corresponding value based on at least one angular velocity value obtained from the angular velocity sensor being larger than a first threshold value
wherein the angular velocity sensor obtains a first angular velocity value corresponding to a first direction, and a second angular velocity value corresponding to a second direction;
wherein the acceleration sensor obtains a first acceleration value corresponding to a third direction, and a second acceleration value corresponding to the second direction, and
wherein the coordinate information corresponds to the space-corresponding value when the first angular velocity value and the second angular velocity value are less than the first threshold value, and the first acceleration value and the second acceleration value are less than a second threshold value.

13. A method of controlling a movement of a pointer displayed on a screen based on a movement of an input apparatus including a casing, the control method comprising:
detecting, by an inertia sensor, a movement of the casing, the detecting including an acceleration of the casing and an angular velocity of the casing;
judging whether the movement of the casing is on a plane or in space; and
making a switch between, based on a detection value of the inertia sensor, a calculation of a plane-corresponding value that corresponds to the movement of the casing on the plane, the plane-corresponding value corresponding to a displacement amount of the pointer on the screen, and a calculation of a space-corresponding value that corresponds to the movement of the casing in space, the space-corresponding value corresponding to the displacement amount of the pointer on the screen,
wherein the switch is made from the calculation of the plane-corresponding value to the calculation of the space-corresponding value based on at least one angular velocity value being larger than a first threshold value,
wherein a first angular velocity value corresponding to a first direction is detected by the inertia sensor, and a second angular velocity value corresponding to a second direction is detected by the inertia sensor;
wherein a first acceleration value corresponding to a third direction is detected by the inertia sensor, and a second acceleration value corresponding to the second direction is detected by the inertia sensor, and
wherein the switch is made form the calculation of the plane-corresponding value to the calculation of the space-corresponding value when the first angular velocity value and the second angular velocity value are less than the first threshold value, and the first acceleration value and the second acceleration value are less than a second threshold value.

14. A handheld apparatus for controlling a movement of a pointer on a screen, the handheld apparatus comprising:
a casing;
a display section to display the screen;
an inertia sensor to detect a movement of the casing, the inertia sensor including an acceleration sensor to detect an acceleration of the casing and an angular velocity sensor to detect an angular velocity of the casing;
a plane-corresponding value calculation means for calculating, based on a detection value of the inertia sensor, a plane-corresponding value that corresponds to the movement of the casing on a plane, the plane-corresponding value corresponding to a displacement amount of the pointer on the screen;
a space-corresponding value calculation means for calculating, based on the detection value of the inertia sensor, a space-corresponding value that corresponds to the movement of the casing in space, the space-corresponding value corresponding to the displacement amount of the pointer on the screen;
a judgment means for judging whether the movement of the casing is on the plane or in space; and
a switch means for making a switch between, based on the judgment by the judgment means, the calculation of the plane-corresponding value and the calculation of the space-corresponding value, wherein the switch mean switches from the calculation of the plane-corresponding value to the calculation of the space-corresponding value based on at least one angular velocity value obtained from the angular velocity sensor being larger than a first threshold value,
wherein the angular velocity sensor obtains a first angular velocity value corresponding to a first direction, and a second angular velocity value corresponding to a second direction;
wherein the acceleration sensor obtains a first acceleration value corresponding to a third direction, and a second acceleration value corresponding to the second direction, and
wherein the switch mean switches from the calculation of the plane-corresponding value to the calculation of the space-corresponding value when the first angular velocity value and the second angular velocity value are less than the first threshold value, and the first acceleration value and the second acceleration value are less than a second threshold value.

15. The input apparatus according to claim 1,
wherein the switch mean switches from the calculation of the space-corresponding value to the calculation of the plane-corresponding value when the first angular velocity value and the second angular velocity value are less than the first threshold value, and at least one on the first acceleration value and the second acceleration value is larger than the second threshold value.

16. The input apparatus according to claim 1, wherein the first threshold value is greater than an angular velocity value obtained when the input apparatus is operated on the plane.

* * * * *